United States Patent
Wu et al.

(10) Patent No.: US 11,954,305 B2
(45) Date of Patent: Apr. 9, 2024

(54) OPERATION METHODS OF A SMART INTERACTIVE TABLET, STORAGE MEDIUM AND RELATED EQUIPMENT

(71) Applicants: GUANGZHOU SHIYUAN ELECTRONICS CO., LTD., Guangzhou (CN); GUANGZHOU SHIZHEN INFORMATION TECHNOLOGY CO., LTD., Guangzhou (CN)

(72) Inventors: Ruiqiang Wu, Guangzhou (CN); Zeming Cai, Guangzhou (CN)

(*) Notice: Subject to any disclaimer, the term of this patent is extended or adjusted under 35 U.S.C. 154(b) by 0 days.

(21) Appl. No.: 18/131,994

(22) Filed: Apr. 7, 2023

(65) Prior Publication Data
US 2023/0350546 A1 Nov. 2, 2023

Related U.S. Application Data

(60) Division of application No. 17/234,615, filed on Apr. 19, 2021, now Pat. No. 11,650,716, which is a
(Continued)

(30) Foreign Application Priority Data
Apr. 8, 2019 (CN) .......................... 201910275277.8

(51) Int. Cl.
*G06F 3/0483* (2013.01)
*G06F 3/041* (2006.01)
(Continued)

(52) U.S. Cl.
CPC .......... *G06F 3/0483* (2013.01); *G06F 3/0412* (2013.01); *G06F 3/0485* (2013.01);
(Continued)

(58) Field of Classification Search
CPC .. G06F 3/0485; G06F 3/0483; G06F 3/04883; G06F 3/0481; G06F 2200/1637;
(Continued)

(56) References Cited

U.S. PATENT DOCUMENTS

2009/0225037 A1* 9/2009 Williamson ........ G06F 3/04883
345/173
2010/0043040 A1 2/2010 Olsen, Jr.
(Continued)

FOREIGN PATENT DOCUMENTS

CN 103399640 A 11/2013
CN 106776514 A 5/2017
(Continued)

OTHER PUBLICATIONS

International Application No. PCT/CN2019/121745, International Search Report and Written Opinion dated Mar. 3, 2020, 13 pages.

*Primary Examiner* — Rayeez R Chowdhury
(74) *Attorney, Agent, or Firm* — Zhong Law LLC

(57) ABSTRACT

The present application discloses an operation method of an interactive flat panel. The method includes starting a slide play mode of the interactive flat panel, displaying a play mode interface of a slide document and an interface of an annotation application on a display screen of the interactive flat panel, wherein the interface of the annotation application is a transparent layer covering the interface of the slide document, and the play mode interface plays a first image of the slide document, and receiving, via a touch sensing device of the interactive flat panel, a touch operation on the interface of the annotation application, wherein the touch operation is a sliding operation of one or more fingers on the interface of the annotation application, and the sliding operation is a horizontal or vertical sliding action relative to a border of the interface of the annotation application.

11 Claims, 24 Drawing Sheets

Related U.S. Application Data continuation of application No. PCT/CN2019/121745, filed on Nov. 28, 2019.

(51) Int. Cl.
*G06F 3/0485* (2022.01)
*G06F 3/0488* (2022.01)
*G06F 16/438* (2019.01)

(52) U.S. Cl.
CPC ........ *G06F 3/0488* (2013.01); *G06F 16/4393* (2019.01); *G06F 2203/04104* (2013.01); *G06F 2203/04804* (2013.01)

(58) Field of Classification Search
CPC . G06F 2203/04803; G06F 2203/04806; G06F 40/169; G06F 1/1626; G06F 2203/04808; G06F 3/01; G06F 3/017; G06F 3/0488; G06F 1/163; G06F 3/14; G06F 3/0482; G06F 3/04845; G06F 3/04855; G06F 16/58; G06F 3/013; G06F 3/04842; G06F 9/451; G06F 1/1686; G06F 16/24578; G06F 16/9535; G06F 2203/04102; G06F 3/038; G06F 3/041; G06F 3/04164; G06F 3/0446; G06F 3/04817; G06F 3/0484; G06F 3/04847; G06F 3/0486; G06F 40/103; G06F 9/541; G06F 1/1656; G06F 1/1652; G06F 1/1694; G06F 3/0487; G06F 3/147; G06F 3/005; G06F 1/1616; G06F 1/1643; G06F 1/1647; G06F 2203/014; G06F 3/016; G06F 3/03543; G06F 1/1662; G06F 1/1666; G06F 1/1671; G06F 3/0219; G06F 3/0221; G06F 3/0235

See application file for complete search history.

(56) References Cited

U.S. PATENT DOCUMENTS

| | | | |
|---|---|---|---|
| 2010/0313113 A1* | 12/2010 | Chen | G06F 16/70 715/205 |
| 2011/0117535 A1 | 5/2011 | Benko et al. | |
| 2011/0300910 A1* | 12/2011 | Choi | G06F 3/0485 455/566 |
| 2012/0110431 A1* | 5/2012 | Rosenfeld | G06F 40/169 715/230 |
| 2012/0192118 A1* | 7/2012 | Migos | G06F 3/0483 715/863 |
| 2012/0235930 A1* | 9/2012 | Lazaridis | G06F 3/017 345/173 |
| 2013/0047125 A1* | 2/2013 | Kangas | G06F 3/04883 715/863 |
| 2013/0069915 A1 | 3/2013 | Kukulj | |
| 2013/0145269 A1 | 6/2013 | Latulipe et al. | |
| 2013/0185642 A1 | 7/2013 | Gammons | |
| 2013/0331152 A1* | 12/2013 | Park | G06F 3/04883 455/566 |
| 2015/0121189 A1 | 4/2015 | Titterington et al. | |
| 2015/0193095 A1 | 7/2015 | Jiang | |
| 2015/0205453 A1 | 7/2015 | Carlos et al. | |
| 2017/0004140 A1 | 1/2017 | Wang et al. | |
| 2018/0088794 A1 | 3/2018 | Graham et al. | |
| 2018/0165255 A1 | 6/2018 | Gafford et al. | |

FOREIGN PATENT DOCUMENTS

| | | |
|---|---|---|
| CN | 108803968 A | 11/2018 |
| CN | 109144382 A | 1/2019 |
| CN | 109388321 A | 2/2019 |
| CN | 110119234 A | 8/2019 |

* cited by examiner

OPERATION METHODS OF A SMART INTERACTIVE TABLET, STORAGE MEDIUM AND RELATED EQUIPMENT

CROSS-REFERENCE TO RELATED APPLICATIONS

The present application is a divisional application of U.S. application Ser. No. 17/234,615 filed Apr. 19, 2021, which is a continuation of International Application No. PCT/CN2019/121745, filed on Nov. 28, 2019, which claims the priority to Chinese Patent Application No. 201910275277.8, filed on Apr. 8, 2019. The contents of the above-mentioned applications are incorporated by reference in their entireties in the present application.

FIELD OF THE INVENTION

The present application relates to the computer technical field, for example, relates to an operation method of an interactive flat panel, a storage medium and related equipment.

BACKGROUND OF THE INVENTION

Various types of smart display devices, especially large-screen display devices (such as interactive flat panels), are increasingly used in life or work.

At present, in the use scenario of the large-screen display device, a user can call an annotation function on a play interface of a slide presentation to annotate the playing contents of the slide presentation. However, after the annotation function is called, if the user needs to control the slide presentation, such as playing a next slide, it is necessary to exit the annotation function, which is quite inconvenient in operation.

SUMMARY OF THE INVENTION

The present application provides an operation method of an interactive flat panel, a storage medium and related equipment, which can solve the problem of inconvenience in slide operation after the annotation interface is called.

The technical solution is as follows.

The present application provide an operation method of an interactive flat panel, comprising:
  displaying a play mode interface of a slide document and an interface of an annotation application, wherein the interface of the annotation application is a transparent layer covering the interface of the slide document;
  receiving a touch operation on the interface of the annotation application;
  when the touch operation is of a first type, performing page-turning of the slide document; and
  when the touch operation is of a second type, annotating the slide document on the interface of the annotation application.

Optionally, the first type is a multi-finger touch operation, and the second type is a single-finger touch operation.

Optionally, the operating system of the interactive flat panel is an Android system, and in the Android system, a getPointerCount function in a MotionEvent class is used to obtain the number of touch points corresponding to the touch operation. If PointerCount is greater than or equal to 2, the touch operation is determined as the multi-finger touch operation; if PointerCount is 1, the touch operation is determined as the single-finger touch operation.

Optionally, the method further comprises:
  obtaining an identifier adding request initiated for the interface of the annotation application, and adding an attribute identifier on the interface of the annotation application based on the identifier adding request.

Optionally, when the touch operation is of the first type, performing page-turning of the slide document comprises:
  when the touch operation is of the first type, sending the touch operation to the interface of the slide document, and performing page-turning of the slide document.

Optionally, the operating system of the interactive flat panel is an Android system, and when the touch operation is of the first type, performing page-turning of the slide document comprises:
  sending the touch operation to the annotation application and the slide document respectively; for the annotation application, calling an onTouchEvent( ) function in a dispatchTouchEvent( ) class, giving no response to the touch operation, and returning false; for the slide document, calling the onTouchEvent( ) function in the dispatchTouchEvent( ) class, responding to the touch operation, and returning true.

Optionally, when the touch operation is of the second type, annotating the slide document on the interface of the annotation application comprises:
  when the touch operation is of the second type, intercepting the touch operation sent to the interface of the slide document; and
  when the touch operation is sent back to the interface of the annotation application corresponding to the attribute identifier, triggering the annotation of the slide document on the interface of the annotation application.

Optionally, the operating system of the interactive flat panel is an Android system, and when the touch operation is of the second type, annotating the slide document on the interface of the annotation application comprises:
  sending the touch operation to the annotation application and the slide document respectively; for the annotation application, calling onTouchEvent( ) in dispatchTouchEvent( ), responding to the touch operation, and returning true; for the slide document, calling onTouchEvent( ) in dispatchTouchEvent( ), giving no response to the touch operation, and returning false.

Optionally, the operating system of the interactive flat panel is an Android system, and intercepting the touch operation sent to the interface of the slide document includes calling an onInterceptTouchEvent( ) function in dispatchTouchEvent( ) to intercept the touch operation.

Optionally, before displaying the play mode interface of the slide document and the interface of the annotation application, the method further comprises:
  receiving a play instruction for triggering the slide document.

Optionally, displaying the play mode interface of the slide document and the interface of the annotation application comprises:
  displaying the play mode interface of the slide document and the interface of the annotation application;
  displaying a slide play control list and an annotation control on the interface of the annotation application, displaying the slide play control list at a first preset position of the interface of the annotation application, and displaying the annotation control at a second preset position of the interface of the annotation application, wherein the first preset position is adjacent to the second preset position, each play control in the slide play control list is used to perform a playing operation on the slide document, and the annotation control is used to perform an annotation operation on the slide document.

Optionally, the slide play control list includes at least one of following function controls:
a page-forward function control, a page-backward function control, or an end-play function control.

Optionally, after displaying the slide play control list and the annotation control on the interface of the annotation application, the method further comprises:
receiving an instruction for triggering the annotation control; and
hiding the annotation control, and displaying sub-function controls corresponding to the annotation control at the second preset position.

Optionally, the sub-function controls corresponding to the annotation control include at least one of following function controls:
an exit annotation function control, a share function control, a storage function control, an erase function control, a color selecting function control, or a hand-writing-thickness selecting function control.

Optionally, displaying the slide play control list at the first preset position of the interface of the annotation application, and displaying the annotation control at the second preset position of the interface of the annotation application comprises:
displaying the slide play control list at an edge position of the interface of the annotation application, and displaying the annotation control at an edge position of the interface of the annotation application.

Optionally, after displaying the slide play control list and the annotation control on the interface of the annotation application, the method further comprises:
receiving an instruction for triggering a play control in the slide play control list; and
playing the slide document based on the triggered play control.

Optionally, after hiding the annotation control, and displaying the sub-function controls corresponding to the annotation control at the second preset position, the method further comprises:
receiving an instruction for triggering a sub-function control; and
displaying a floating frame, wherein the floating frame is displayed on the interface of the annotation application, and the floating frame includes an option control corresponding to the triggered sub-function control.

Optionally, after displaying the floating frame, the method further comprises:
receiving an instruction for triggering the option control in the floating frame; and
displaying a target object corresponding to the triggered option control, wherein the target object is displayed on the interface of the annotation application.

Optionally, the method further comprises:
displaying a system function control list on the interface of the annotation application, and displaying the system function control list at a third preset position of the interface of the annotation application, wherein the system function control list includes a system function control for instructing to switch to a system default interface.

Optionally, the method further comprises:
receiving an instruction for triggering the system function control; and
displaying the system default interface.

Optionally, displaying the system function control list at the third preset position of the interface of the annotation application comprises:
displaying the system function control list at an edge position of the interface of the annotation application.

Optionally, the play control and/or the annotation control are displayed in the form of icons and/or texts.

Optionally, before displaying the play mode interface of the slide document and the interface of the annotation application, the method further comprises:
receiving a wireless screen transmission instruction, and displaying a normal mode interface of the slide document; or,
receiving a local document selecting instruction, and displaying the normal mode interface of the slide document; or,
receiving a document selecting instruction of a removable disk, and displaying the normal mode interface of the slide document.

Optionally, before receiving the wireless screen transmission instruction, displaying the normal mode interface of the slide document or receiving the local document selecting instruction, displaying the normal mode interface of the slide document or receiving the document selecting instruction of the removable disk, and displaying the normal mode interface of the slide document, the method further comprises:
displaying a startup interface of the interactive flat panel, wherein the startup interface includes a PowerPoint presentation control;
receiving an instruction for triggering the PowerPoint presentation control, and displaying sub-function controls corresponding to the PowerPoint presentation control.

Optionally, after displaying the slide play control list and the annotation control on the interface of the annotation application, the method further comprises:
receiving no touch signal within a preset time period after the slide play control list and the annotation control are displayed; and
hiding the slide play control list and the annotation control.

Optionally, when the touch operation is of the first type, after performing page-turning of the slide document, the method further comprises:
displaying contents of the document after the page is turned, and synchronously displaying an annotation handwriting corresponding to the contents of the document after the page is turned.

Optionally, the method further comprises:
when a page-turning instruction is received, synchronously performing page-turning of the slide document and the annotation application.

The present application provides an operation method of an interactive flat panel, comprising:
displaying an interface of a preset format document and an interface of a writing application, wherein the interface of the writing application is a transparent layer covering the interface of the preset format document;
receiving a touch operation on the interface of the writing application;
when the touch operation is of a first type, responding to the touch operation on the interface of the preset format document; and when the touch operation is of a second type, responding to the touch operation on the interface of the writing application.

Optionally, receiving the touch operation on the interface of the writing application comprises:
  receiving a finger touch operation on the interface of the writing application, and obtaining the number of touch points of the finger touch operation;
  when the touch operation is of the first type, responding to the touch operation on the interface of the preset format document comprises:
  when the number of touch points meets a first number range, sending the finger touch operation to the interface of the preset format document, and responding to the finger touch operation on the interface of the preset format document;
  when the touch operation is of the second type, responding to the touch operation on the interface of the writing application comprises:
  when the number of touch points meets a second number range, sending the finger touch operation to the interface of the writing application, and responding to the finger touch operation on the interface of the writing application, wherein the second number range is different from the first number range.

Optionally, the operating system of the interactive flat panel is an Android system; in the Android system, the getPointerCount function in the MotionEvent class is used to obtain the number of touch points corresponding to the finger touch operation; if PointerCount is greater than or equal to 2, it is determined that the finger touch operation is the multi-finger touch operation; if PointerCount is 1, it is determined that the finger touch operation is the single-finger touch operation.

Optionally, receiving the touch operation on the interface of the writing application comprises:
  receiving a pen touch operation in an overlap area, and obtaining the touch contact area of the pen touch operation;
  when the touch operation is of the first type, responding to the touch operation on the interface of the preset format document comprises:
  when the touch contact area meets a first area range, sending the pen touch operation to the interface of the preset format document, and responding to the pen touch operation on the interface of the preset format document;
  when the touch operation is of the second type, responding to the touch operation on the interface of the writing application comprises:
  when the touch contact area meets a second area range, sending the pen touch operation to the interface of the writing application, and responding to the pen touch operation on the interface of the writing application, wherein the second area range is different from the first area range.

Optionally, responding to the pen touch operation on the interface of the writing application comprises:
  obtaining a touch position of the pen touch operation; and
  inputting text information at the touch position on the interface of the writing application.

Optionally, the operating system of the interactive flat panel is an Android system, and when the touch operation is of the first type, responding to the touch operation on the interface of the preset format document comprises:
  sending the touch operation to the writing application and the preset format document respectively; for the writing application, calling onTouchEvent( ) in dispatchTouchEvent( ), giving no response to the touch operation, and returning false; for the preset format document, calling onTouchEvent( ) in dispatchTouchEvent( ), responding to the touch operation, and returning true.

Optionally, the method further comprises:
  obtaining an identifier adding request initiated for the interface of the writing application, and adding an attribute identifier on the interface of the writing application based on the identifier adding request;
  responding to the touch operation on the interface of the writing application includes:
  intercepting the touch operation sent to the interface of the preset format document, and when the touch operation is sent back to the interface of the writing application corresponding to the attribute identifier, triggering to response to the touch operation on the interface of the writing application.

Optionally, the operating system of the interactive flat panel is an Android system, and when the touch operation is of the second type, responding to the touch operation on the interface of the writing application comprises:
  sending the touch operation to the writing application and the preset format document respectively; for the writing application, calling onTouchEvent( ) in dispatchTouchEvent( ), responding to the touch operation, and returning true; for the preset format document, calling onTouchEvent( ) in dispatchTouchEvent( ), giving no response to the touch operation, and returning false.

Optionally, the operating system of the interactive flat panel is an Android system, and intercepting the touch operation sent to the interface of the preset format document comprises calling onInterceptTouchEvent( ) in dispatchTouchEvent( ) to intercept the touch operation.

The present application provides an operation method of an interactive flat panel, comprising:
  starting the interactive flat panel;
  starting a slide play mode of the interactive flat panel;
  displaying a play mode interface of a slide document and an interface of an annotation application on a display screen of the interactive flat panel, wherein the interface of the annotation application is a transparent layer covering the interface of the slide document, and the play mode interface plays a first image of the slide document;
  a touch sensing device of the interactive flat panel receiving a touch operation on the interface of the annotation application; wherein the touch operation is a sliding operation of a finger on the interface of the annotation application; the sliding operation is a horizontal or vertical sliding action relative to a border of the interface of the annotation application;
  when the sliding operation is a single-finger sliding operation, an Android mainboard of the interactive flat panel controlling the display screen of the interactive flat panel to display a sliding trajectory corresponding to the sliding operation; the first image of the slide document played through the play mode interface remaining as it is;
  when the sliding operation is a multi-finger sliding operation, if the multi-finger sliding operation is a sliding operation of at least two fingers on the interface of the annotation application at the same time, and the multi-finger sliding operation is performed from top to bottom or from right to left relative to the interface of the annotation application, the Android mainboard of the interactive flat panel controlling the display screen to display a second interface of the slide document, and the display screen not displaying the sliding trajectory corresponding to the multi-finger sliding operation on the interface of the annotation application.

Optionally, the operating system of the interactive flat panel is an Android system; in the Android system, getPointerCount in MotionEvent class is used to obtain the number of touch points corresponding to the touch operation; if PointerCount is greater than or equal to 2, the touch operation is determined as the multi-finger sliding operation; if PointerCount is 1, the touch operation is determined as the single-finger sliding operation.

Optionally, the operating system of the interactive flat panel is an Android system, and when the sliding operation is the multi-finger sliding operation, an Android mainboard of the interactive flat panel controlling the display screen to display the second interface of the slide document comprises:

sending the touch operation to the annotation application and the slide document respectively; for the annotation application, calling onTouchEvent( ) in dispatchTouchEvent( ), giving no response to the touch operation, and returning false; for the slide document, calling onTouchEvent( ) in dispatchTouchEvent( ), responding to the touch operation, and returning true.

Optionally, the operating system of the interactive flat panel is an Android system, and when the sliding operation is the single-finger sliding operation, an Android mainboard of the interactive flat panel controlling the display screen of the interactive flat panel to display the sliding trajectory corresponding to the sliding operation comprises:

sending the touch operation to the annotation application and the slide document respectively; for the annotation application, calling onTouchEvent( ) in dispatchTouchEvent( ), responding to the touch operation, and returning true; for the slide document, calling onTouchEvent( ) in dispatchTouchEvent( ), giving no response to the touch operation, and returning false.

Optionally, the operating system of the interactive flat panel is an Android system, and for the slide document, calling onTouchEvent( ) in dispatchTouchEvent( ), giving no response to the touch operation, and returning false includes calling onInterceptTouchEvent( ) in dispatchTouchEvent( ) to intercept the touch operation.

The present application further provides an operation device of an interactive flat panel, comprising:

an interface display module configured to display a play mode interface of a slide document and an interface of an annotation application, wherein the interface of the annotation application is a transparent layer covering the interface of the slide document;

an operation receiving module configured to receive a touch operation on the interface of the annotation application;

a document page-turning module configured to, when the touch operation is of a first type, perform page-turning of the slide document; and a document annotation module configured to, when the touch operation is of a second type, annotate the slide document on the interface of the annotation application.

Optionally, the first type is a multi-finger touch operation, and the second type is a single-finger touch operation.

Optionally, the operating system of the interactive flat panel is an Android system; in the Android system, the device further comprises a type determining module configured to use getPointerCount in MotionEvent class to obtain the number of touch points corresponding to the touch operation; if PointerCount is greater than or equal to 2, it is determined that the touch operation is the multi-finger touch operation; if PointerCount is 1, it is determined that the touch operation is the single-finger touch operation.

Optionally, the device further comprises:

an identifier adding module configured to obtain an identifier adding request initiated for the interface of the annotation application, and add an attribute identifier on the interface of the annotation application based on the identifier adding request.

Optionally, the document page-turning module is configured to:

when the touch operation is of the first type, send the touch operation to the interface of the slide document, and perform page-turning of the slide document.

Optionally, the document page-turning module is configured to:

send the touch operation to the annotation application and the slide document respectively; for the annotation application, call onTouchEvent( ) in dispatchTouchEvent( ), give no response to the touch operation, and return false; for the slide document, call onTouchEvent( ) in dispatchTouchEvent( ), respond to the touch operation, and return true.

Optionally, the document annotation module is configured to:

when the touch operation is of the second type, intercept the touch operation sent to the interface of the slide document; and when the touch operation is sent back to the interface of the annotation application corresponding to the attribute identifier, trigger to annotate the slide document on the interface of the annotation application.

Optionally, the operating system of the interactive flat panel is an Android system, and the document annotation module is configured to:

send the touch operation to the annotation application and the slide document respectively; for the annotation application, call onTouchEvent( ) in dispatchTouchEvent( ), respond to the touch operation, and return true; for the slide document, call onTouchEvent( ) in dispatchTouchEvent( ), give no response to the touch operation, and return false.

Optionally, the operating system of the interactive flat panel is an Android system, and the document annotation module is configured to call onInterceptTouchEvent( ) in dispatchTouchEvent( ) to intercept the touch operation.

Optionally, the device further comprises:

a play-instruction receiving module configured to receive a play instruction for triggering the slide document.

Optionally, the interface display module is configured to:

display the play mode interface of the slide document and the interface of the annotation application; and display a slide play control list and an annotation control on the interface of the annotation application, display the slide play control list at a first preset position of the interface of the annotation application, and display the annotation control at a second preset position of the interface of the annotation application, wherein the first preset position is adjacent to the second preset position, each play control in the slide play control list is used to perform a playing operation on the slide document, and the annotation control is used to perform an annotation operation on the slide document.

Optionally, the slide play control list includes at least one of following function controls:
a page-forward function control, a page-backward function control, or an end-play function control.

Optionally, the device further comprises:
an annotation-instruction receiving module configured to receive an instruction for triggering the annotation control; and
a sub-function display module configured to hide the annotation control, and display sub-function controls corresponding to the annotation control at the second preset position.

Optionally, the sub-function controls corresponding to the annotation control include at least one of following function controls:
an exit annotation function control, a share function control, a storage function control, an erase function control, a color selecting function control, or a handwriting-thickness selecting function control.

Optionally, the interface display module is configured to:
display the slide play control list at an edge position of the interface of the annotation application, and display the annotation control at an edge position of the interface of the annotation application.

Optionally, the device further comprises:
a play-control triggering module configured to receive an instruction for triggering a play control in the slide play control list; and
a document play module configured to play the slide document based on the triggered play control.

Optionally, the device further comprises:
a sub-function triggering module configured to receive an instruction for triggering a sub-function control; and
a floating-frame display module configured to display a floating frame, wherein the floating frame is displayed on the interface of the annotation application, and the floating frame includes an option control corresponding to the triggered sub-function controls.

Optionally, the device further comprises:
an option-control triggering module configured to receive an instruction for triggering the option control in the floating frame; and
an object display module configured to display a target object corresponding to the triggered option control, wherein the target object is displayed on the interface of the annotation application.

Optionally, the device further comprises:
a system-control display module configured to display a system function control list on the interface of the annotation application, and display the system function control list at a third preset position of the interface of the annotation application, wherein the system function control list includes a system function control for instructing to switch to a system default interface.

Optionally, the device further comprises:
a system-function triggering module configured to receive an instruction for triggering the system function control; and
a system-interface display module configured to display the system default interface.

Optionally, the system-control display module is configured to:
display the system function control list at an edge position of the interface of the annotation application.

Optionally, the play control and/or the annotation control are displayed in the form of icons and/or texts.

Optionally, the device further comprises:
a screen-transmission-instruction receiving module configured to receive a wireless screen transmission instruction, and display a normal mode interface of the slide document; or,
a selecting-instruction receiving module configured to receive a local document selecting instruction, and display the normal mode interface of the slide document; wherein:
the selecting-instruction receiving module may be further configured to receive a document selecting instruction of a removable disk, and display the normal mode interface of the slide document.

Optionally, the device further comprises:
a startup-interface display module configured to display a startup interface of the interactive flat panel, wherein the startup interface includes a PowerPoint presentation control; and
a presenting-instruction receiving module configured to receive an instruction for triggering the PowerPoint presentation control, and display sub-function controls corresponding to the PowerPoint presentation control.

Optionally, the device further comprises:
a signal detecting module configured to receive no touch signal within a preset time period after the slide play control list and the annotation control are displayed; and
a control hidden module configured to hide the slide play control list and the annotation control.

Optionally, the device further comprises:
a synchronous display module configured to display contents of the document after the page is turned, and synchronously display an annotation handwriting corresponding to the contents of the document after the page is turned.

Optionally, the device further comprises:
a synchronous page-turning module configured to, when a page-turning instruction is received, synchronously perform page-turning of the slide document and the annotation application.

The present application provides an operation device of an interactive flat panel, comprising:
an interface display module configured to display an interface of a preset format document and an interface of a writing application, wherein the interface of the writing application is a transparent layer covering the interface of the preset format document;
an operation receiving module configured to receive a touch operation on the interface of the writing application;
a first responding module configured to, when the touch operation is of a first type, respond to the touch operation on the interface of the preset format document; and
a second responding module configured to, when the touch operation is of a second type, respond to the touch operation on the interface of the writing application.

Optionally, the operation receiving module is configured to:
receive a finger touch operation on the interface of the writing application, and obtain the number of touch points of the finger touch operation;
the first responding module is configured to:
when the number of touch points meets a first number range, send the finger touch operation to the interface of the preset format document, and respond to the finger touch operation on the interface of the preset format document;

the second responding module is configured to:

when the number of touch points meets a second number range, send the finger touch operation to the interface of the writing application, and respond to the finger touch operation on the interface of the writing application, wherein the second number range is different from the first number range.

Optionally, the operating system of the interactive flat panel is an Android system; in the Android system, the operation receiving module is configured to use getPointerCount in MotionEvent class to obtain the number of touch points corresponding to the finger touch operation; if PointerCount is greater than or equal to 2, it is determined that the finger touch operation is the multi-finger touch operation; if PointerCount is 1, it is determined that the finger touch operation is the single-finger touch operation.

Optionally, the operation receiving module is configured to:

receive a pen touch operation in an overlap area, and obtain the touch contact area of the pen touch operation;

the first responding module is configured to:

when the touch contact area meets a first area range, send the pen touch operation to the interface of the preset format document, and respond to the pen touch operation on the interface of the preset format document;

the second responding module is configured to:

when the touch contact area meets a second area range, send the pen touch operation to the interface of the writing application, and respond to the pen touch operation on the interface of the writing application, wherein the second area range is different from the first area range.

Optionally, the second responding module is configured to:

obtain a touch position of the pen touch operation; and
input text information at the touch position on the interface of the writing application. Optionally, the first responding module is configured to:

send the touch operation to the writing application and the preset format document respectively; for the writing application, call onTouchEvent( ) in dispatchTouchEvent( ), give no response to the touch operation, and return false; for the preset format document, call onTouchEvent( ) in dispatchTouchEvent( ), respond to the touch operation, and return true.

Optionally, the device further comprises:

an identifier adding module configured to obtain an identifier adding request initiated for the interface of the writing application, and add an attribute identifier on the interface of the writing application based on the identifier adding request;

wherein the second responding module is configured to:

intercept the touch operation sent to the interface of the preset format document, and when the touch operation is sent back to the interface of the writing application corresponding to the attribute identifier, trigger to response to the touch operation on the interface of the writing application.

Optionally, the operating system of the interactive flat panel is an Android system, and the second responding module is configured to:

send the touch operation to the writing application and the preset format document respectively; for the writing application, call onTouchEvent( ) in dispatchTouchEvent( ), respond to the touch operation, and return true; for the preset format document, call onTouchEvent( ) in dispatchTouchEvent( ), give no response to the touch operation, and return false.

Optionally, the operating system of the interactive flat panel is an Android system, and the second responding module is configured to call onInterceptTouchEvent( ) in dispatchTouchEvent( ) to intercept the touch operation.

The present application provides an operation device of an interactive flat panel, comprising:

a tablet start module configured to start the interactive flat panel;

a mode start module configured to start a slide play mode of the interactive flat panel;

an interface display module configured to display a play mode interface of a slide document and an interface of an annotation application on a display screen of the interactive flat panel, wherein the interface of the annotation application is a transparent layer covering the interface of the slide document; the play mode interface plays a first image of the slide document;

a touch sensing module configured to receive a touch operation on the interface of the annotation application; wherein the touch operation is a sliding operation of a finger on the interface of the annotation application; the sliding operation is a horizontal or vertical sliding action relative to a border of the interface of the annotation application;

a first control module configured such that, when the sliding operation is a single-finger sliding operation, an Android mainboard of the interactive flat panel controls the display screen of the interactive flat panel to display a sliding trajectory corresponding to the sliding operation; the first image of the slide document played through the play mode interface remains as it is;

a second control module configured such that, when the sliding operation is a multi-finger sliding operation, if the multi-finger sliding operation is a sliding operation of at least two fingers on the interface of the annotation application at the same time, and the multi-finger sliding operation is performed from top to bottom or from right to left relative to the interface of the annotation application, the Android mainboard of the interactive flat panel controls the display screen to display a second interface of the slide document, and the display screen does not display the sliding trajectory corresponding to the multi-finger sliding operation on the interface of the annotation application.

Optionally, the operating system of the interactive flat panel is an Android system; in the Android system, the touch sensing module is configured to use getPointerCount in MotionEvent class to obtain the number of touch points corresponding to the touch operation; if PointerCount is greater than or equal to 2, the touch operation is determined as the multi-finger sliding operation; if PointerCount is 1, the touch operation is determined as the single-finger sliding operation.

Optionally, the second control module is configured to:

send the touch operation to the annotation application and the slide document respectively; for the annotation application, call onTouchEvent( ) in dispatchTouchEvent( ), give no response to the touch operation, and return false; for the slide document, call onTouchEvent( ) in dispatchTouchEvent( ), respond to the touch operation, and return true.

Optionally, the operating system of the interactive flat panel is an Android system, and the first control module is configured to:

send the touch operation to the annotation application and the slide document respectively; for the annotation application, call onTouchEvent( ) in dispatchTouchEvent( ), respond to the touch operation, and return true; for the slide document, call onTouchEvent( ) in dispatchTouchEvent( ), give no response to the touch operation, and return false.

Optionally, the operating system of the interactive flat panel is an Android system, and the first control module is concretely configured to call onInterceptTouchEvent( ) in dispatchTouchEvent( ) to intercept the touch operation.

The present application further provides a computer storage medium, wherein the computer storage medium stores a plurality of instructions, and the instructions, when loaded and executed by a processor, causes the processor to perform the steps of the above-mentioned method.

According to an eighth aspect, the present application provides an interactive flat panel, which can comprise: a processor and a memory; wherein the memory stores a computer program, and the computer program, when loaded and executed by a processor, causes the processor to perform the steps of the above-mentioned method.

In the technical solutions of the present application comprises, a play mode interface of a slide document and an interface of an annotation application are displayed on an interactive flat panel. The interface of the annotation application is a transparent layer covering the interface of the slide document configured to receive a touch operation on the interface of the annotation application. When the touch operation is of a first type, the page-turning of the slide document is performed, and when the touch operation is of a second type, the slide document is annotated on the interface of the annotation application. In an Android system, touch events are usually abstracted and simplified into three types: pressing, moving, and lifting. For example, when a finger is pressed in a certain area, the Android system may send the touch event to the application in the top-most window of the area. Subsequent touching events such as moving and lifting are handed over to the application for processing, and the touch events are not sent to other applications covered by the window. As a result, the problem described in background section of the disclosure will occur, i.e., it is necessary to exit the annotation function to continue to operate the slide. In one or more embodiments of the present application, because an Android platform of the interactive flat panel can modify an operation sending logic of the system, it is possible to implement touch operations on the interface of the annotation application to turn pages of the slide document. This reduces the difficulty of operating the interface of a lower layer by touching the interface of an upper layer in the scene that two display interfaces are overlapped. There is no need to exit the annotation interface, and it is only necessary to recognize the operation type of the touch operation on the interface of the annotation application, so as to trigger direct control of the slide in the case that the annotation interface has been started. The operation is convenient and quick, which improves the convenience of the slide operation after calling the annotation interface.

BRIEF DESCRIPTION OF THE DRAWINGS

FIG. 5-1 is a schematic diagram illustrating an example of a boot interface provided by an embodiment of the present application.

FIG. 5-2 is a schematic diagram illustrating an example of displaying sub-function controls of a PowerPoint presentation control provided by an embodiment of the present application.

FIG. 6-1 is a schematic diagram illustrating an example of displaying system function controls on a display screen provided by an embodiment of the present application.

FIG. 6-2 is a schematic diagram illustrating an example of displaying system function controls on a display screen provided by an embodiment of the present application.

FIG. 6-3 is a schematic diagram illustrating an example of displaying system function controls on a display screen provided by an embodiment of the present application.

FIG. 6-4 is a schematic diagram illustrating an example of displaying system function controls on a display screen provided by an embodiment of the present application.

FIG. 6-5 is a schematic diagram illustrating an example of displaying system function controls on a display screen provided by an embodiment of the present application.

DESCRIPTION OF THE PREFERRED EMBODIMENTS

Figure 1:
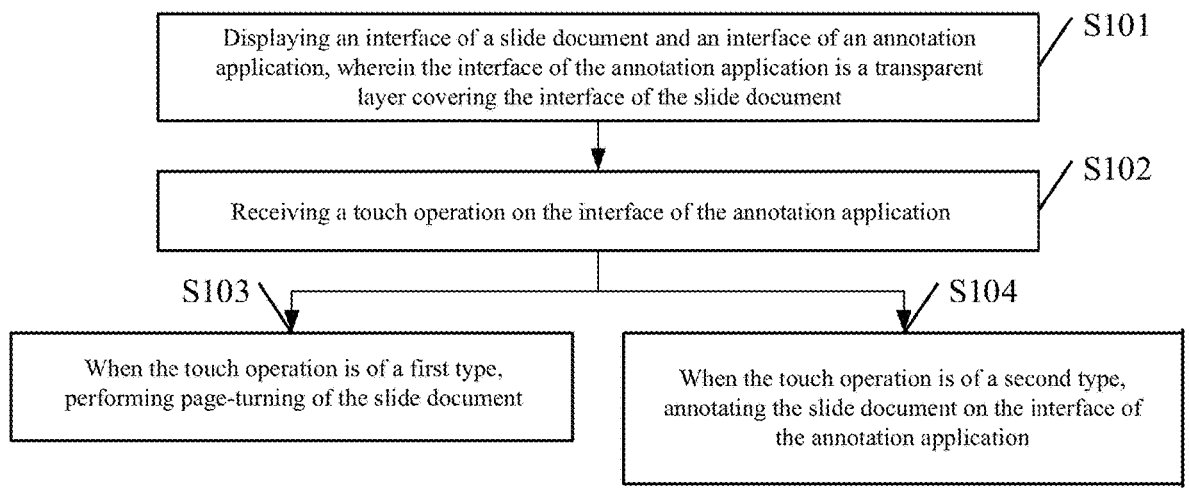
FIG. 1 is a schematic flowchart illustrating a method of an interactive flat panel provided by an embodiment of the present application.

Hereinafter, the embodiments of the present application will be further described in detail with reference to the accompanying drawings.

When the following description refers to the drawings, unless otherwise indicated, the same numbers in different drawings represent the same or similar elements. The implementation approaches described hereinafter in the exemplary embodiments do not represent all implementation approaches consistent with the present application. On the contrary, the implementation approaches are merely examples of devices and methods detailed in the appended claims, which are consistent with some aspects of the present application.

In the description of the present application, it should be understood that the terms "first," "second," etc. are only used for descriptive purposes, and cannot be understood as indicating or implying relative importance. For those skilled in the art, the meanings of the above-mentioned terms in the present application can be understood in combination with the circumstances in which they are described. In addition, in the description of the present application, unless otherwise indicated, "multiple" means two or more. "And/or" describes the association relationship of the associated objects, indicating that there can be three types of relationships. For example, A and/or B can mean: A alone exists, A and B exist at the same time, or B exists alone. The character "/" generally indicates that the associated objects are in an "or" relationship.

The hardware part of the interactive flat panel includes a display module, a smart processing system (including a controller), and other parts, which are combined by an overall structural member, and are also supported by a dedicated software system. The display module includes a display screen and backlight components, wherein the display screen includes a transparent conductive layer and a liquid crystal layer.

In one or more embodiments in this description, the display screen refers to a touch screen, a touch control screen, and a touch panel, which is an inductive liquid crystal display device. When a graphic button on the screen is touched, a tactile feedback system on the screen can drive various connected devices according to pre-programmed programs, which can be used to replace a mechanical button panel, and create a vivid audio-visual effect via a liquid crystal display screen. On the basis of technical principles, touch screens can be divided into five basic categories: touch screen using a vector pressure sensing technology, touch screen using a resistive technology, touch screen using a capacitive technology, touch screen using an infrared technology, and touch screen using a surface acoustic wave technology. On the basis of the working principle of the touch screen and the medium of information transmission, touch screens can be divided into four types: a resistive type, a capacitive sensing type, an infrared type, and a surface acoustic wave type.

When a user touches the screen with a finger or a pen, the coordinates of the point are positioned to realize the control of the smart processing system, and then realize different functional applications with the built-in software of the smart processing system.

In one or more embodiments of the present application, the meaning of displaying a certain interface on the display screen of an interactive flat panel is the same as displaying the interface on the display module of the interactive flat panel.

A "screen" and "large screen" mentioned in the present application both refer to the display screen of an interactive flat panel. Displaying a certain interface on the interactive flat panel refers to displaying the interface on the display screen of the interactive flat panel.

The embodiments of the present application disclose an operation method of an interactive flat panel, and the method is applied to the interactive flat panel.

Hereinafter, an operation method of the interactive flat panel provided by an embodiment of the present application will be described in detail with reference to FIGS. 1-13.

Referring to FIG. 1, FIG. 1 is a flowchart illustrating an operation method of an interactive flat panel disclosed in an embodiment of the present application. The method includes the following steps.

At S101, a play mode interface of a slide document and an interface of an annotation application is displaying, wherein the interface of the annotation application is a transparent layer covering the interface of the slide document.

The slide document may be a PowerPoint document, and the corresponding document format may be .ppt. The display interface of the slide document can include different modes, such as a normal mode, an outline mode, a slide mode, a browsing mode, and a play mode.

As described herein, the normal mode includes three parts: an outline bar (mainly used to display and edit a text outline of a PowerPoint presentation, which lists the page number, theme, and corresponding key points of each slide in the PowerPoint presentation), a slide bar (mainly used to display and edit the detailed content of the slide in the PowerPoint presentation), and a remark bar (mainly used to add prompt information to the corresponding slide, and serve as a memo and reminder for the user; the information in the remark bar is not seen by the user when the PowerPoint presentation is actually played).

The outline mode may be mainly used to view and organize the outline of the PowerPoint presentation. Compared with the normal mode, the outline bar and the remark bar are expanded, while the slide bar is compressed.

The slide mode may be mainly used to edit contents of each slide in the PowerPoint presentation in more detail. At this time, the outline bar only displays a slide number, the remark bar is hidden, and the slide bar is enlarged.

The browsing mode may display all the slides in the PowerPoint presentation in a minimized form. In this mode, it is possible to adjust the slide sequence, design slide animations, set slide shows, and set slide switch.

The play mode may be used to view the playing effect of a designed PowerPoint presentation and play the PowerPoint presentation.

In one or more embodiments of the present application, the involved application scenario is that the slide document is in the play mode, and when the document content in this play mode is displayed, the annotation application is also synchronously started and displays the interface of the annotation application.

Figure 2:
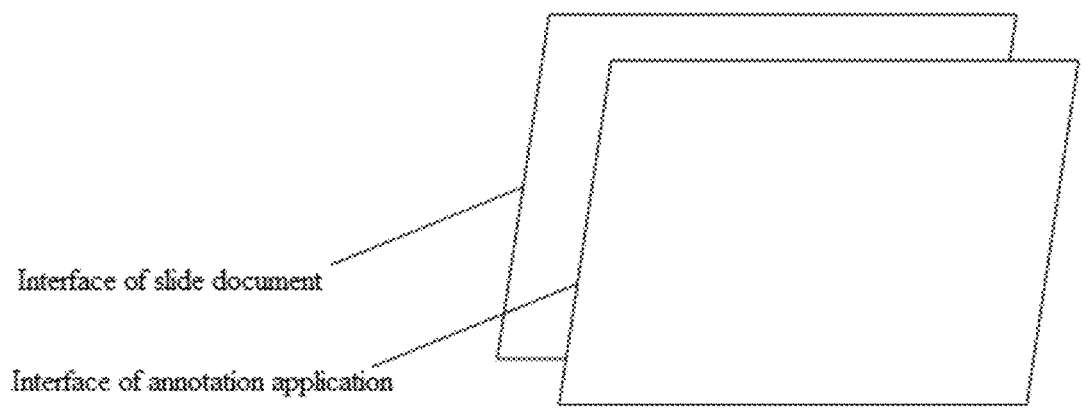
FIG. 2 is a schematic diagram illustrating the display effect of an interface of a slide document and an interface of an annotation application provided by an embodiment of the present application.

It should be noted that the interface of the annotation application is a transparent layer and covers the interface of the slide document. That is, on the current display interface, the play mode interface of the slide document and the interface of the annotation application are displayed at the same time. Moreover, the play mode interface of the slide document is displayed in a lower layer, and the interface of the annotation application is displayed in an upper layer. Moreover, the interface of the annotation application is transparent, and will not block the display contents of the slide document. A feasible display mode is shown in FIG. 2.

As described herein, the annotation application, which is a real-time writing program, is used to supplement and expand certain information, and runs as a background service. In the annotation application, there are functions such as pen, eraser, sharing, shutdown, page-up and page-down. For PPT, page-up, page-down and shutdown of playing are functions of controlling PPT, and other information is information related to writing, for example, pen: writing, eraser: clearing, sharing: saving a content locally, etc., shutdown: turning off the annotation function. After the annotation application is started, the display interface displays a message such as "You are already in the annotation mode", and the corresponding function controls are displayed at a preset position of the annotation interface.

At S102, a touch operation may be received on the interface of the annotation application.

The touch operation is the operation initiated by a user on the interface of the annotation application, which can be performed by direct touch with fingers, or touch with a stylus.

The touch operation can include touch information such as the number of touch points, a fingerprint of a touch point, a touch pressure value of a touch point, the contact area of a touch point, and a touch trajectory. When the interactive flat panel receives the touch operation, the touch information in the touch operation is acquired.

It should be noted that an operation receiving view is pre-created on the interface of the annotation application, and when the user inputs the touch operation on the operation receiving view, the interactive flat panel can recognize the touch operation.

At S103, when the touch operation is of a first type, page-turning of the slide document is performed.

The first type can be of any operation type, and can be categorized based on the touch information carried by the touch operation.

For example, when the touch information includes the number of touch points, the first type can be that equal to 1, greater than 1, greater than or equal to 1, less than or equal to 3, and/or the like.

As another example, when the touch information includes the touch contact area, the first type can be greater than or equal to a preset area threshold, less than the preset area threshold, within a preset area threshold range, outside the preset area threshold range, and/or the like.

As another example, when the touch information includes a touch fingerprint, the first type can be any set fingerprint, such as thumb fingerprints, and index finger fingerprints.

As another example, when the touch information includes a touch pressure value, the first type can be any set feasible pressure value range.

By comparing the touch information of the touch operation with the first type, if the touch information of the touch operation matches the first type, page-turning of the slide document is performed, thereby realizing the touch penetration function. In one or more embodiments of the present application, the first type can be multi-finger touch.

The page-turning includes page-forward and page-backward. The number of turned pages can be determined according to a preset rule. For example, turning one page per operation, or turning multiple pages (such as 2 pages) per operation.

Optionally, the page-turning of the slide document can also be performed through a page-turning control displayed on the interface of the annotation application. Similarly, the number of turned pages can be determined according to a preset rule.

At S104, when the touch operation is of a second type, the slide document may be annotated on the interface of the annotation application.

Correspondingly, the second type is different from the first type, and is also categorized according to the touch information. The second type and the first type can be categorized based on the same touch information, or can be categorized based on different touch information.

For example, the second type and the first type can be categorized based on the number of touch points. The first type is a first preset number, the second type is a second preset number, and the first preset number is different from the second preset number.

As another example, the second type can be categorized based on the number of touch points, and the first type can be categorized based on the touch contact area.

By comparing the touch information of the touch operation with the second type, if the touch information of the touch operation matches the second type, an annotation is performed on the interface of the annotation application, and the annotation handwriting is displayed based on the sliding screen trajectory input by the user, thereby realizing a basic response on the window to the touch operation. In one or more embodiments of the present application, the second type can be a single-finger touch.

In one or more embodiments of the present application comprises, a play mode interface of a slide document and an interface of an annotation application are displayed on an interactive flat panel, and the interface of the annotation application is a transparent layer covering the interface of the slide document A touch operation on the interface of the annotation application may be received. When the touch operation is of a first type, the page-turning of the slide document is performed, and when the touch operation is of a second type, the slide document is annotated on the interface of the annotation application. In an Android system, touch events are usually abstracted and simplified into three types: pressing, moving, and lifting. For example, when a finger is pressed in a certain area, the Android system may send the touch event to the application in the topmost window of the area. Subsequent touch events such as moving and lifting are handed over to the application for processing, and the touch events are not be sent to other applications covered by the window. As a result, the problem described in the background of the application will occur, i.e., it will become necessary to exit the annotation function to continue to operate the slide. In one or more embodiments of the present application, because Android platform of the interactive flat panel can modify an operation sending logic of the system, it is possible to implement touch operations on the interface of the annotation application to perform page-turning of the slide document. This reduces the difficulty of operating the interface of a lower layer by touching the interface of an upper layer in the case where two display interfaces are overlapped. There is no need to exit the annotation interface, and it is only necessary to recognize the operation type of the touch operation on the interface of the annotation application, so as to trigger direct control of the slide in the case that the annotation interface has been started. The operation is convenient and quick, which improves the convenience of the slide operation after calling the annotation interface.

Figure 3:
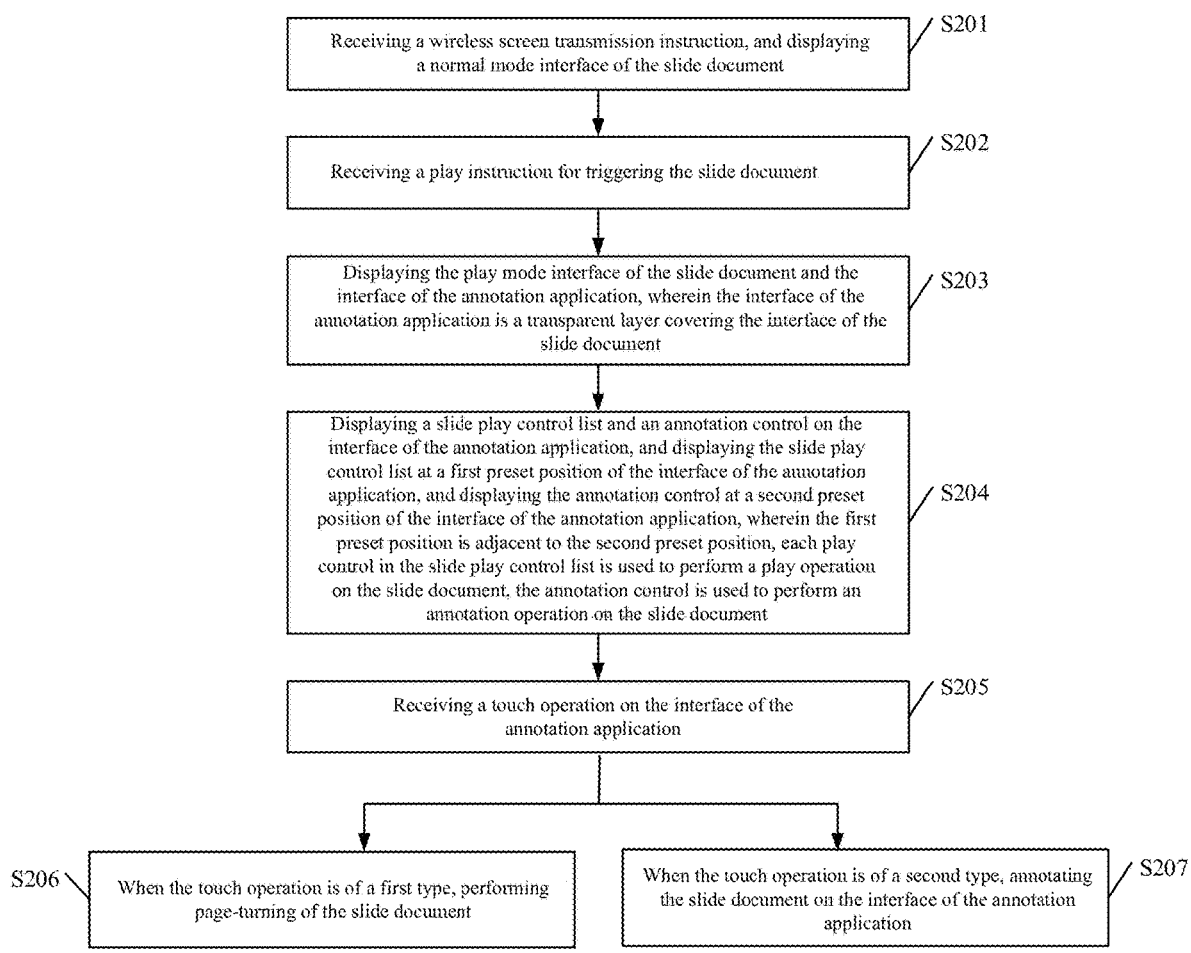
FIG. 3 is a schematic flowchart illustrating a method of an interactive flat panel provided by an embodiment of the present application.

Referring to FIG. 3, FIG. 3 is a flowchart illustrating an operation method of an interactive flat panel disclosed in an embodiment of the present application. The method includes the following steps.

At S201, a wireless screen transmission instruction is received, and a normal mode interface of the slide document is displayed.

The slide document is PowerPoint document, and the corresponding document format is .ppt. The display interface of the slide document can include different modes, such as a normal mode, an outline mode, a slide mode, a browsing mode, and/or a play mode.

As described herein, the normal mode includes three parts: an outline bar (mainly used to display and edit a text outline of a PowerPoint presentation, which lists the page number, theme and corresponding key points of each slide in the PowerPoint presentation), a slide bar (mainly used to display and edit the detailed content of the slide in the PowerPoint presentation), and a remark bar (mainly used to add prompt information to the corresponding slide, and serve as a memo and reminder for the user; the information in the remark bar is not seen by the user when the PowerPoint presentation is actually played).

The outline mode may be mainly used to view and organize the outline of the PowerPoint presentation. Compared with the normal mode, the outline bar and the remark bar are expanded, while the slide bar is compressed.

The slide mode may be mainly used to edit contents of each slide in the PowerPoint presentation in more detail. At this time, the outline bar only displays a slide number, the remark bar is hidden, and the slide bar is enlarged.

In the browsing mode, all the slides in the PowerPoint presentation are displayed in a minimized form. In this mode, it is possible to adjust the slide sequence, design slide animations, set slide shows, and set slide switch.

The play mode may be used to view the playing effect of a designed PowerPoint presentation and play the PowerPoint presentation.

Figure 4:
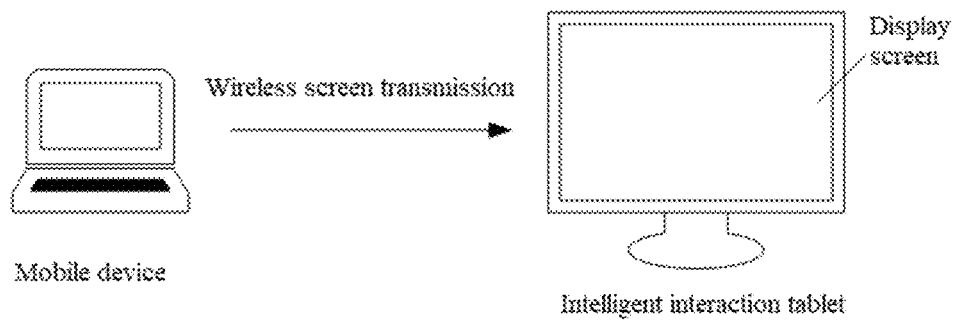
FIG. 4 is a schematic diagram illustrating a system architecture for wireless screen transmission provided by an embodiment of the present application.

In one or more embodiments of the present application, when the normal mode of the slide document is displayed on a mobile device (such as a laptop), if the wireless screen transmission function between the mobile device and the interactive flat panel is established at this time, the display content of the current display interface of the mobile device may be displayed on the display screen of the interactive flat panel (that is, the normal mode of the slide document), and the corresponding screen transmission architecture is shown in FIG. 4.

Optionally, if the boot interface of the interactive flat panel is currently displayed and the boot interface includes a PowerPoint presentation control, the received wireless screen transmission instruction can also be an instruction for triggering the PowerPoint presentation control, and sub-function controls corresponding to the PowerPoint presentation control are displayed. The sub-function controls include wireless screen transmission function controls. The displaying of an identifier control of the mobile terminal connected with the interactive flat panel on the display interface can be triggered by selecting one of the wireless screen transmission function controls. When a certain identifier control is triggered, a wireless screen transmission connection is established between the mobile device and the interactive flat panel, so that the slide document displayed on the mobile device can be transmitted to the screen of the smart interactive device for display.

Figures 1, 5:
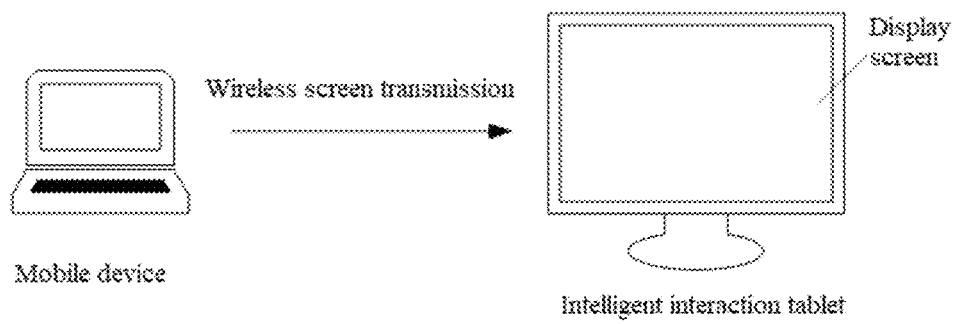
Figures 2, 5:
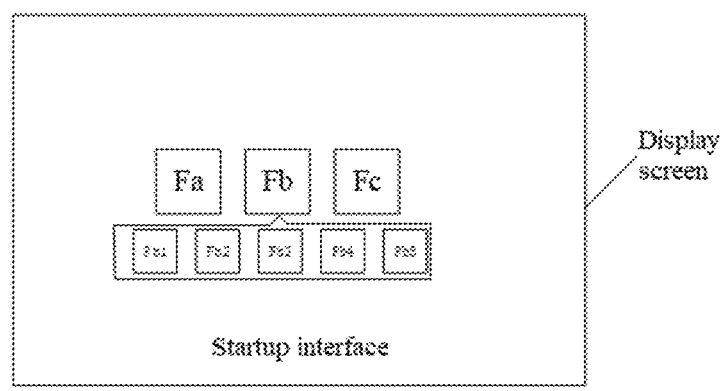

For example, as shown in FIG. 5-1, Fb is a PowerPoint presentation control, and when this control is clicked, sub-function controls Fb1, Fb2, Fb3, Fb4, Fb5 are displayed. As shown in FIG. 5-2, Fb3 is a wireless screen transmission function control.

Optionally, the sub-function controls also include a local-document selecting control. As shown in FIG. 5-2, when the user clicks the control Fb1, the interactive flat panel receives a local document selecting instruction, so as to determine the corresponding slide document and display the normal mode interface of the slide document.

Optionally, the sub-function controls can also include a control for selecting a document of a removable disk. As shown in FIG. 5-2, when the user clicks the control Fb2, the interactive flat panel receives a document selecting instruction of a U-disk-, so as to determine the corresponding slide document and display the normal mode interface of the slide document.

By displaying various document selecting methods, more methods for opening the slide document can be provided, including opening the slide document from a removable disk, opening the slide document locally, and opening the slide document via screen transmission.

Figures 1, 6:
Figures 2, 6:
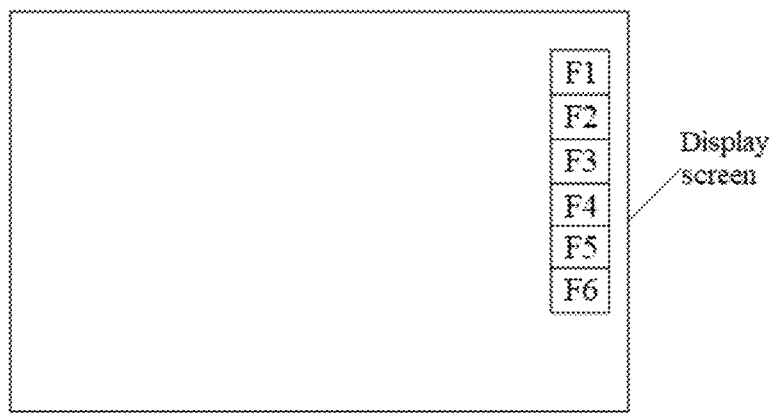
Figures 3, 6:
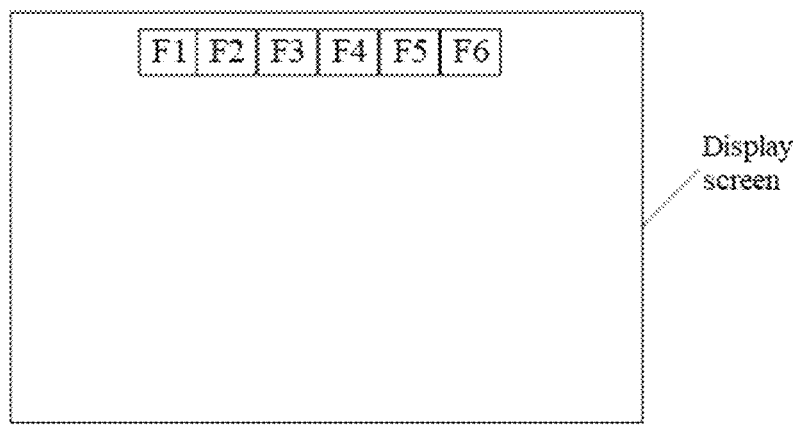
Figures 4, 6:
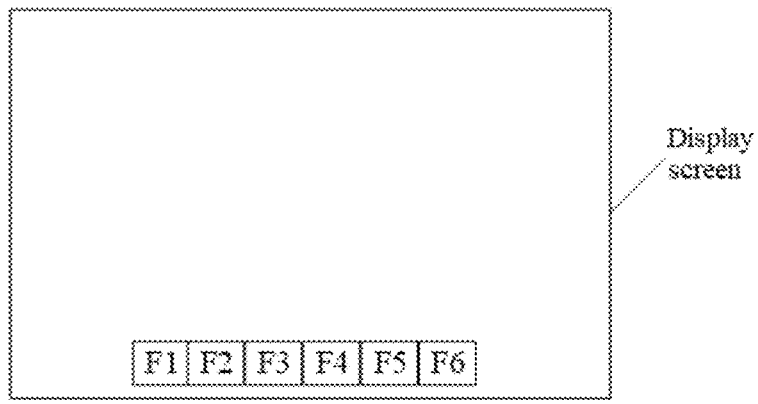
Figures 5, 6:
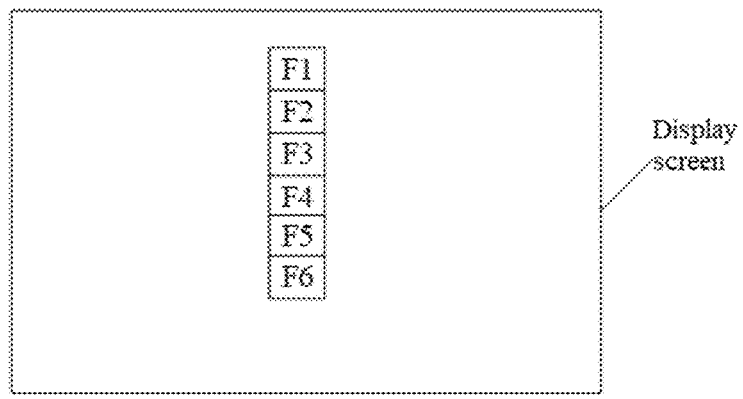

In the current normal mode interface, a system operation function control list can also be displayed. The system operation function control list is displayed at a preset position of the interface. The preset position can be the edge position of the interface or the middle position of the interface. The system operation function control list can be displayed at one or more of the following positions: the left edge position (as shown in FIG. 6-1) of the normal mode interface, the right edge position (as shown in FIG. 6-2) of the normal mode interface, the upper edge position (as shown in FIG. 6-3) of the normal mode interface, the lower edge position (as shown in FIG. 6-4) of the normal mode interface, or the middle position (as shown in FIG. 6-5) of the normal mode interface. For example, the system operation function control list is displayed at the left and right edge positions of the normal mode interface. Whether the user stands on the left or right side of the interactive flat panel, it is easy and convenient to operate the function controls displayed on the interactive flat panel. As described herein, the function control displayed at the left edge position is the same as the function control displayed at the right edge position.

At S202, a play instruction for triggering the slide document may be received.

A play control is displayed on the normal mode interface of the slide document. The user can click the play control on the mobile device, so as to switch the slide document to the play mode, while a screen transmission file displayed on the interactive flat panel is also synchronously switched to the play mode. The user can also click the play control on the interactive flat panel to switch the displayed slide document from the normal mode to the play mode.

At S203, the play mode interface of the slide document and the interface of the annotation application may be displayed, wherein the interface of the annotation application is a transparent layer that covers the interface of the slide document.

When the slide document is switched to the play mode, the play mode interface of the slide document is displayed under the current display interface, and at the same time, the startup of the interface of the annotation application is also triggered.

It should be noted that the interface of the annotation application is a transparent layer and covers the interface of the slide document. That is, on the current display interface, the play mode interface of the slide document and the interface of the annotation application are displayed at the same time. Moreover, the play mode interface of the slide document is displayed in a lower layer, and the interface of the annotation application is displayed in an upper layer. Moreover, the interface of the annotation application is transparent, and will not block the display contents of the slide document. A feasible display mode is shown in FIG. 2.

As described herein, the annotation application is a real-time writing program that may be used to supplement and expand certain information, and may run as a background service. In the annotation application, there are functions such as pen, eraser, sharing, shutdown, page-up and page-down. For PPT, page-up, page-down, and shutdown of playing are functions associated with controlling a PPT document, and the other functions are related to writing. For example, the pen function may be used for writing, the eraser function may be used for clearing contents, the sharing function may be used for saving contents locally and at other locations, and the shutdown function may be used for turning off the annotation function. After the annotation application is started, the display interface may display a message such as "You are already in the annotation mode", and the corresponding function controls are displayed at a preset position of the annotation interface.

At S204, a slide play control list and an annotation control on the interface of the annotation application may be displayed. The slide play control list at a first preset position of the interface of the annotation application, and the annotation control at a second preset position of the interface of the annotation application may also be displayed, wherein the first preset position is adjacent to the second preset position, each play control in the slide play control list is used to perform a playing operation on the slide document, and the annotation control is used to perform an annotation operation on the slide document.

A feasible display method is that the annotation function control displayed in the normal mode is moved from the original preset position to another preset position of the interface of the annotation application. At the same time, a slide play control list is added to the interface of the annotation application.

Figure 7:
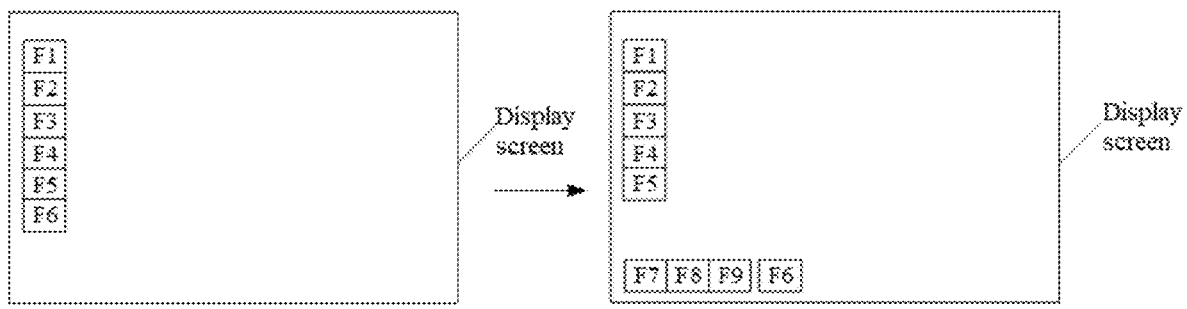
FIG. 7 is an effect schematic diagram illustrating display function controls of a slide document on a play mode interface provided by an embodiment of the present application.

For example, as shown in FIG. 7, if F6 is an annotation function control, after the slide document enters the play mode page, F6 is moved from the left edge position to the bottom edge position, and at the same time, a slide play control list composed of F7, F8 and F9 are displayed at a position adjacent to F6.

The slide play control list includes at least one of the following function controls: a page-forward function control, a page-backward function control, or an end-play function control.

As described herein, the page-forward function control is used to control the slide document to be turned from the current page to the front page. For example, if the current page is the second page, the slide document can be turned to the first page through the page-forward function.

The page-backward function control is used to control the slide document to be turned from the current page to the following page. If the current page is the second page, the slide document can be turned to the third page through the page-backward function.

The end play function control is used to exit the play mode page of the slide document and display other mode pages (such as the normal mode page) of the slide document.

When the user operates the play controls, the interactive flat panel receives an instruction for triggering a play control in the slide play control list, and plays the slide document (exiting the play mode) based on the triggered play control (such as the end-play function control). There is no need to exit the annotation function or close the annotation application to operate the controls on the play mode page of the slide document, so as to control the playing of the slide document. The operation is convenient, quick, and simple, and improves the convenience of the slide document operation under the annotation mode.

Optionally, the slide play control list is displayed at an edge position of the interface of the annotation application, and the annotation control is displayed at an edge position of the interface of the annotation application.

When the user clicks the annotation control, the interactive flat panel receives an instruction for triggering the annotation control, hides the annotation control, and displays sub-function controls corresponding to the annotation control at the second preset position.

Figure 8:
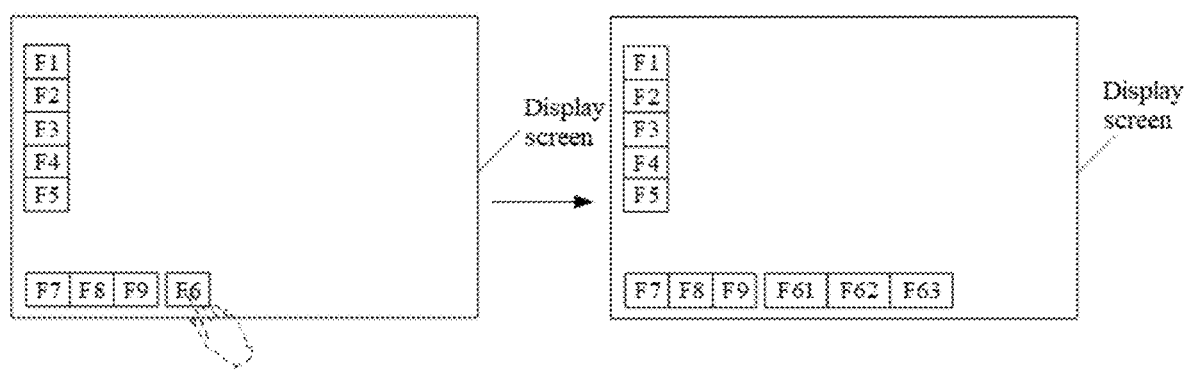
FIG. 8 is an effect schematic diagram illustrating display sub-function controls corresponding to an annotation control provided by an embodiment of the present application.

For example, as shown in FIG. 8, when the user clicks the control F6 (annotation control), the interactive flat panel hides the control F6 and displays the sub-function controls such as F61, F62, F63 at the same position. When the user needs to use the annotation function, the sub-function controls may be expanded and displayed, and when the user does not need to use the annotation function, the annotation control can be folded and displayed. This display mode can save the displaying space of the controls and prevent the controls from blocking the display contents of the slide document.

The sub-function controls corresponding to the annotation control include at least one of following function controls: an exit annotation function control, a share function control, a storage function control, an erase function control, a color selecting function control, or a handwriting-thickness selecting function control.

When the user triggers the sub-function controls corresponding to the annotation control, the interactive flat panel receives an instruction for triggering sub-function controls, and then displays a floating frame, wherein the floating frame is displayed on the interface of the annotation application, and the floating frame includes an option control corresponding to the triggered sub-function control.

Figure 9:
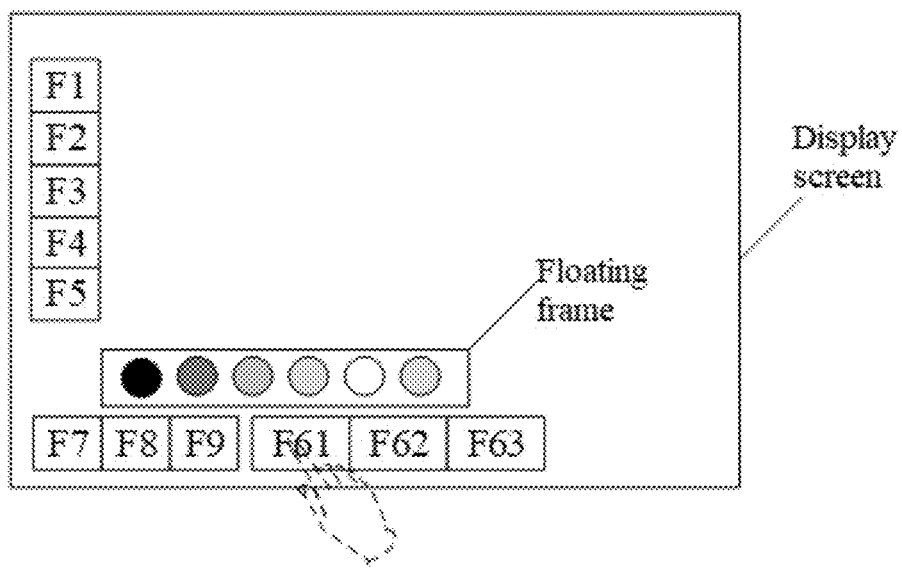
FIG. 9 is an effect schematic diagram illustrating the display of a floating frame provided by an embodiment of the present application.

For example, as shown in FIG. 9, if F61 is a color selecting function control, when the user clicks F61, a color floating frame pops up, and the colors displayed therein are the option controls under the color control. The floating frame is displayed on the interface of the annotation application.

An instruction for triggering the option control in the floating frame may be received, and a target object corresponding to the triggered option control may be displayed, wherein the target object is displayed on the interface of the annotation application.

Figure 10:
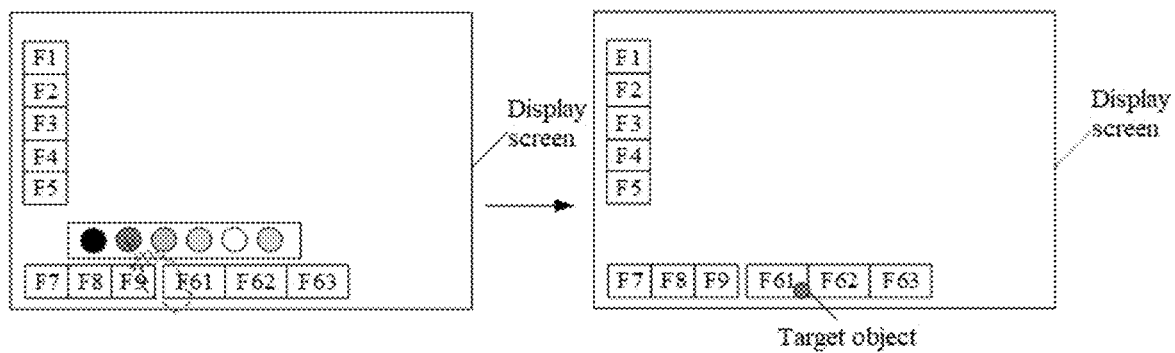
FIG. 10 is an effect schematic diagram illustrating the display of a target object provided by an embodiment of the present application.

For example, as shown in FIG. 10, if the user selects a second color option control, after the selection is completed, the floating frame is hidden, and the selected color object is displayed on the color function selecting control F61, so that the user can intuitively and clearly know the currently used color. The user does not need to determine the currently used color by writing on the interface of the annotation application, thus enhancing the intuitiveness and convenience of the operation.

As described herein, for each sub-function control in the annotation control, the concrete functions are as follows.

After the exit annotation function control is triggered, the interactive flat panel hides the expanded sub-function controls and displays the annotation function control at the same position. At this time, the user cannot use the annotation function.

After the share function control is triggered, the interactive flat panel displays the address that can be shared, and the user can select the sharing address as needed.

After the storage function control is triggered, the interactive flat panel synchronously stores the annotated page with the annotation handwriting and the corresponding slide document to a local default address.

After the erase function control is triggered, the interactive flat panel displays an erase board icon to facilitate the user to erase the written handwriting.

After the color selecting function control is triggered, the interactive flat panel displays a variety of colors, and the user can select the color to be used as needed.

After the handwriting-thickness selecting function control is triggered, the interactive flat panel displays a variety of handwritings with different thicknesses, and the user can select a handwriting according to actual needs.

Optionally, a system function control list is displayed on the interface of the annotation application, and the system function control list is displayed at a third preset position of the interface of the annotation application, wherein the system function control list includes a system function control for instructing the switch to a system default interface.

In addition to displaying the function controls for operating the slide document, the interface of the annotation application can also display the function control list of the operating system. As shown in F1~F5 in FIG. 10, the interface of the annotation application includes the function controls of switching to the default interface. If F1 is "Back to the main interface", it is possible to directly jump to the main interface of the system by clicking F1, so that it is possible to perform operation on the main interface to execute other functions.

The system function control list can also include a system setting control, a return control, a multi-page display control, and/or the like. At the same of operating the slide document, when the user needs to operate other pages, the switching can be performed through the displayed system function controls without exiting the current play mode, and it is possible to quickly return to the play mode interface of the slide document through the operating system function controls, which makes the operation convenient and efficient.

It should be noted that the system function control list can also be displayed at an edge position of the interface of the annotation application, and the edge position is different from the display position of the slide play control list and the annotation control.

At the same time, in order to allow the user to quickly control the interactive flat panel regardless of whether the user is standing on the left or right side of the interactive flat panel, the system function control list, the slide play control list, and the annotation control can be displayed symmetrically on the display interface of the interactive flat panel.

Optionally, the play control and/or the annotation control are displayed in the form of icons and/or texts.

Figure 11:
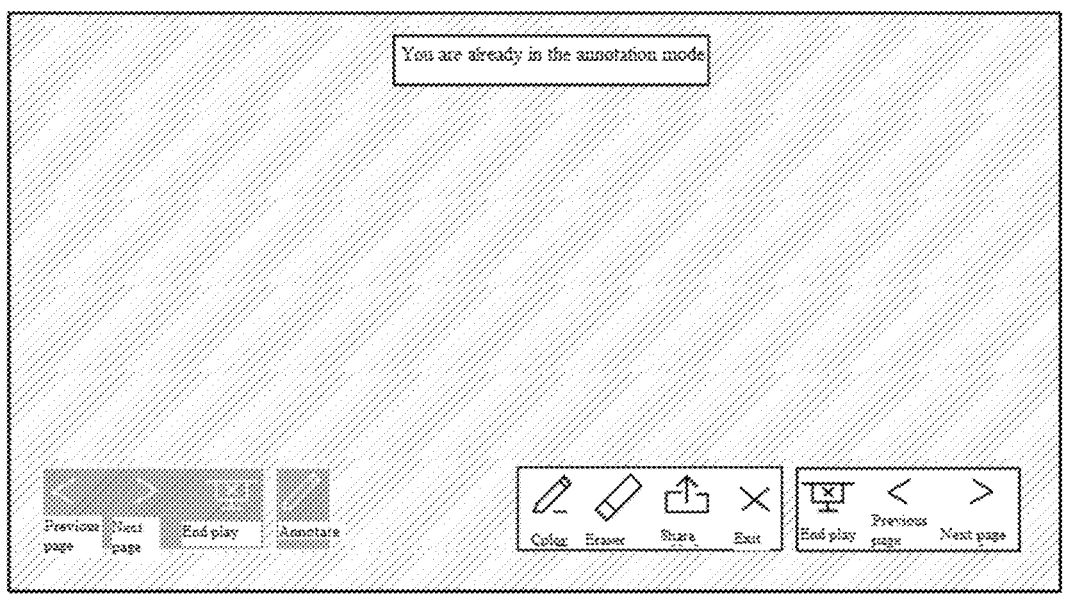
FIG. 11 is a schematic diagram illustrating a display interface of an annotation application provided by an embodiment of the present application.

For example, FIG. 11 shows a display interface of an annotation application. Multiple function controls are displayed therein, and each function control comprises texts and icons for display.

It is also possible to display only the icons or only the texts, the choice of which is not limited herein.

Optionally, after displaying the slide play control list and the annotation control on the interface of the annotation application, the method further includes receiving no touch signal within a preset time period after the slide play control list and the annotation control are displayed, and hiding the slide play control list and the annotation control.

The preset time period can be any time period set by the user, such as 3 minutes, or 5 minutes. If the interactive flat panel does not receive a touch signal within a certain preset time period, it can be considered that the user has stopped operating the interactive flat panel. In this case, the displayed function controls are hidden. Therefore, it is possible to prevent the function controls from blocking the content displayed on the slide document.

Optionally, if the interactive flat panel does not receive a touch signal for a long time period, the interactive flat panel is switched to a standby mode.

At S205, a touch operation may be received on the interface of the annotation application.

The touch operation is an operation initiated by a user on the interface of the annotation application. The touch operation can be performed by a direct touch with fingers, or a touch with a stylus. In one or more embodiments of the present application, a finger touch operation is taken as an example for description.

The touch operation can include touch information such as the number of touch points, a fingerprint of a touch point, a touch pressure value of a touch point, the contact area of a touch point, and/or a touch trajectory. When the interactive flat panel receives the touch operation, the touch information in the touch operation is acquired.

It should be noted that an operation receiving view is pre-created on the interface of the annotation application, and when the user inputs the touch operation on the operation receiving view, the interactive flat panel can recognize the touch operation.

As described herein, creating a view (View) on the interface of the annotation application can include the following two methods: one is to call onCreate of Activity and execute setContentView to create a View object, and the other one is to acquire a WindowManager and call addView thereof, and hand over the view to WindowManagerService for management.

At S206, when the touch operation is of a first type, page-turning of the slide document is performed.

The first type can be any operation type, and can be categorized based on the touch information carried by the touch operation.

For example, when the touch information includes the number of touch points, the first type can be equal to 1, greater than 1, greater than or equal to 1 and less than or equal to 3, and/or the like.

As another example, when the touch information includes the touch contact area, the first type can be greater than or equal to a preset area threshold, less than the preset area threshold, within a preset area threshold range, outside the preset area threshold range, and/or the like.

As another example, when the touch information includes a touch fingerprint, the first type can be any set of fingerprints, such as thumb fingerprints, and/or index finger fingerprints.

As another example, when the touch information includes a touch pressure value, the first type can be any set feasible pressure value range.

In one or more embodiments of the present application, the first type can be a multi-finger touch. By comparing the touch information of the touch operation with the first type, if the touch information of the touch operation matches the first type, page-turning of the slide document is performed. That is, the control of the interface at a lower layer is realized through the operation on the interface at an upper layer, thereby realizing the touch penetration function.

The page-turning includes page-forward and page-backward. The number of turned pages can be determined according to a preset rule such as turning one page per operation, or turning multiple pages (such as 2 pages) per operation.

Figure 12:
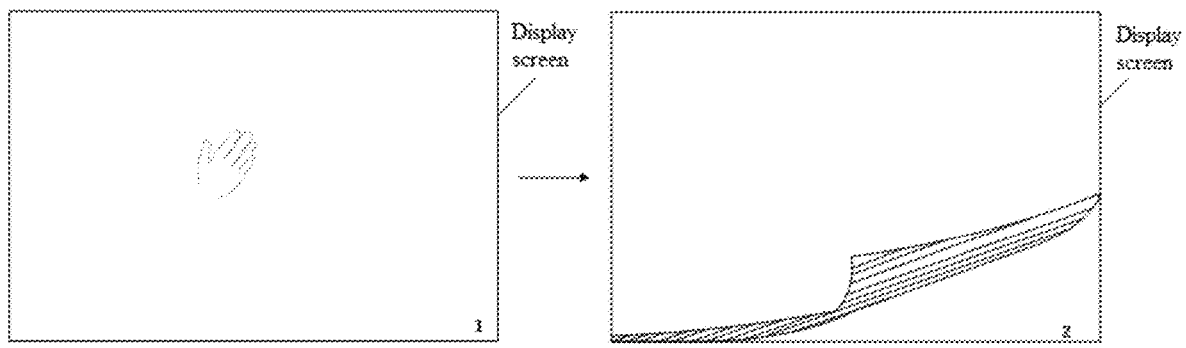
FIG. 12 is an effect schematic diagram illustrating the control of page-turning of a slide document by a multi-finger touch provided by an embodiment of the present application.

For example, as shown in FIG. 12, the first page of the slide document is currently displayed, and when the user touches the interface of the annotation application covered thereon with multiple fingers, the slide document is turned to the second page.

Optionally, page-turning of the slide document can also be operated through a page-turning control displayed on the interface of the annotation application. Similarly, the number of turned pages can be determined according to a preset rule.

When the touch operation is of the first type, the touch operation is sent to the interface of the slide document, and pages of the slide document are turned.

As described herein, operation sending refers to the process in which after a touch operation (MotionEvent) is generated, the system needs to send the touch operation to a concrete view (View). In one or more embodiments of the present application, operation sending is to send the finger touch operation to the interface of the slide document.

In an Android system, the operation sending can be understood as: the user touches the display screen to generate a touch operation (MotionEvent), the operation is received by Activity, and the operation is transmitted by Activity after being received. The transmission process is: Activity→Window→DecorView (DecorView is the underlying container of the current interface, which is ViewGroup)→executing dispatchTouchEvent( ) of ViewGroup, wherein dispatchTouchEvent( ) is used to send the operation.

In an Android system, onTouchEvent( ) can be called in dispatchTouchEvent( ), and whether the finger touch operation is consumed is determined by a returned value. If the returned value is false, no consumption is indicated, and in the same operation (finger touch operation) sequence, the interface will not receive the operation again. If the returned value is true, consumption is indicated.

In an example implementation, the terminal sends the operation information of the finger touch operation to the interface of the annotation application located at an upper layer and the play mode interface of the slide document located at a lower layer. For the annotation application, onTouchEvent( ) is called in dispatchTouchEvent( ), and false is returned. At this time, the following operations are triggered: for the interface of the slide document, calling onTouchEvent( ) in dispatchTouchEvent( ), responding to the finger touch operation, and returning true. Thus, a penetration response is realized to the finger touch operation on the overlapping interfaces.

Optionally, when a page-turning instruction is received, the page-turning of the slide document and the annotation application are performed synchronously.

It can be understood that the displayed annotation is a multi-page annotation, and each page of the annotation corresponds to a slide respectively. If the slide document includes 10 pages, the display page of the annotation application includes 10 pages.

When the slide document displayed on the current page is annotated, if the slide document is turned to the next page, the handwriting of the annotation and the slide document are saved accordingly and the pages thereof are synchronously turned. Then the next page of the slide document and the next page of annotations are displayed.

As described herein, the first type can be a page-turning instruction. The page-turning instruction can also be initiated by clicking a page-turning control on the display interface.

Optionally, when the touch operation is of the first type, after performing page-turning of the slide document, the method further includes displaying contents of the document after the page is turned, and synchronously displaying an annotation handwriting corresponding to the contents of the document after the page is turned. This allows for quick finding of key information in the document based on the displayed annotations when the slide document is reviewed.

At S207, when the touch operation is of the second type, the slide document is annotated on the interface of the annotation application.

In one or more embodiments of the present application, the second type is a single-finger touch operation. When the touch operation is of the second type, the touch operation sent to the interface of the slide document is intercepted, and when the touch operation is sent back to the interface of the annotation application corresponding to the attribute identifier, annotation of the slide document on the interface of the annotation application is triggered.

The attribute identifier is used to uniquely identify the interface of the annotation application, and can include TAG identifier, ID, etc. The purpose of adding the attribute identifier to the interface of the annotation application is to facilitate the search for the interface of the annotation application, so that the interface of the annotation application can be quickly determined as a directional interface.

In an example implementation, after the touch event is sent to the annotation application with the attribute identifier, the annotation application determines the type of the touch event. If the touch event is a single-finger touch operation, the annotation application responds to the touch event and annotates the slide document on the interface of the annotation application. The touch event is not sent to the interface of the slide document covered by the annotation application. If the touch event is a multi-finger touch operation, the annotation application does not respond to the touch event, and sends the touch event to the interface of the slide document. The touch event is responded by the slide document. Optionally, the annotation application is a system-level application, so that the annotation application can implement functions such as responding to and forwarding touch events. Optionally, if the touch event is a multi-finger touch operation, the annotation application can encapsulate the touch event into a direction event (such as up, down, left, and right buttons are pressed) generated by a device such as a keyboard or a remote control, and the direction event is sent to the interface of the slide document, so as to realize the page-turning operation on the slide document.

A user may perform an editing operation on the interface of the annotation application to generate an identifier adding request. After receiving the request, the terminal adds an attribute identifier to the interface of the annotation application. The attribute identifier can be added to any display area of the interface of the annotation application, such as the upper left corner. The added attribute identifier can be found in the underlying identifier library, or can be currently generated.

In an example implementation, each interface has an attribute identifier, and each attribute identifier is represented by a set of binary codes, which can include multiple bits (such as 32 bits). The attribute identifier of the interface of the annotation application can be found in the underlying identifier library and marked on the interface of the annotation application.

After the finger touch operation is sent to the interface of the annotation application, the finger touch operation sent to the interface of the slide document is intercepted and sent back, and the operation sending process is ended, so as to trigger to respond to the finger touch operation on the interface of the annotation application. As described herein, for an Android system, onInterceptTouchEvent( ) can be called in dispatchTouchEvent( ) to intercept the finger touch operation.

The finger touch operation responded on the second window can include multiple operations such as writing, roaming, and opening another page.

It should be noted that due to limited space, the present application does not exhaust all the implementation approaches. As long as the features are not contradictory, the implementation approaches can be combined and become optional implementation approaches of the present application.

In one or more embodiments of the present application, a play mode interface of a slide document and an interface of an annotation application are displayed on an interactive flat panel, and the interface of the annotation application is a transparent layer covering the interface of the slide document. A touch operation on the interface of the annotation application may be received. When the touch operation is of a first type, page-turning of the slide document is performed, and when the touch operation is of a second type, the slide document is annotated on the interface of the annotation application. In an Android system, touch events are usually abstracted and simplified into three types: pressing, moving, and lifting. For example, when a finger is pressed in a certain area, the Android system may send the touch event to the application in the topmost window of the area, subsequent moving and lifting touch events are handed over to the application for processing, and the touch events are not sent to other applications covered by the window. As result, the problem described in background of the invention will occur, which makes it necessary to exit the annotation function to continue to operate the slide. In one or more embodiments of the present application, because Android platform of the interactive flat panel can modify an operation sending logic of the system, it is possible to implement touch operations on the interface of the annotation application to perform page-turning of the slide document. This reduces the difficulty of operating the interface of the lower layer by touching the interface of the upper layer in the scene that two display interfaces are overlapped. There is no need to exit the annotation interface, and it only needs to recognize the operation type of the touch operation on the interface of the annotation application, so as to trigger to directly control the slide in the case that the annotation interface has been started. The operation is convenient and quick, which improves the convenience of the slide operation after calling the annotation interface. In addition, by displaying relevant controls on the interface of the annotation application, it is possible to facilitate operating the slide document, and quickly switching to other display interfaces. This design conforms to the habits of the user and improves the user experience while also improving the operating efficiency of the slide document.

Figure 13:
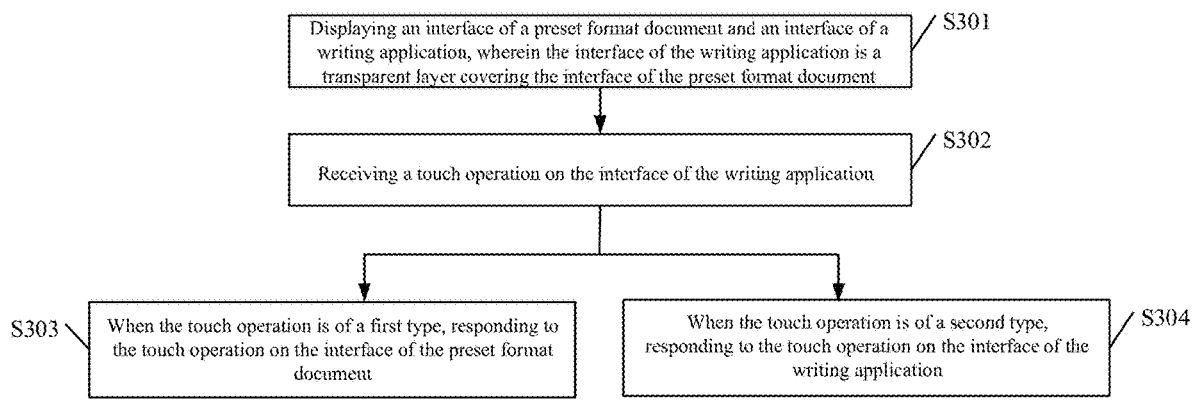
FIG. 13 is a schematic flowchart illustrating a method of an interactive flat panel provided by an embodiment of the present application.

Referring to FIG. 13, which is a flowchart of an operation method of an interactive flat panel disclosed in an embodiment of the present application. The method includes the following steps.

At S301, an interface of a preset format document and an interface of a writing application are displayed, wherein the interface of the writing application is a transparent layer covering the interface of the preset format document.

The displayed interface of the preset format document and the interface of the writing application are different interfaces. In addition, the interface of the preset format document and the interface of the writing application have an overlapping area, and the two interfaces can overlap partially or completely. In other words, there is a hierarchical relationship between the two interfaces. If the interface of the writing application covers the interface of the preset format document, the interface of the writing application is the interface at an upper layer, the interface of the preset format document is the interface at a lower layer, and the interface of the writing application is transparent, without blocking the display content of the preset format document.

The two interfaces can correspond to different applications. The two interfaces can be started by starting the two applications, or, after the interface of the preset format document is started, the interface of the writing application is created.

After both interfaces are started, the two interfaces are displayed on the same display interface. The two interfaces can be displayed according to a preset display rule. For example, the interface of the writing application covers the interface of the preset format document in a transparent display manner.

As described herein, the preset display rule can be interface display size, interface display position, interface display style (static, dynamic), etc.

At S302, a touch operation may be received on the interface of the writing application.

The touch operation is the operation initiated by the user for the interface of the writing application. The touch operation can be a finger touch operation or a pen touch operation. The touch operation can include touch information such as the number of touch points, a fingerprint of a touch point, a touch pressure value of a touch point, the contact area of a touch point, and a touch trajectory. When the interactive flat panel receives the touch operation, the touch information in the touch operation is acquired.

It should be noted that an operation receiving view is pre-created on the interface of the writing application, and the touch operation is initiated on the operation receiving view.

When the touch operation is a finger touch operation, the interactive flat panel receives the finger touch operation on the interface of the writing application, and acquires the number of touch points of the finger touch operation.

Since the created operation receiving view is used to receive touch operations, when the user touches the view with a finger, the interactive flat panel can sense and respond to the generated touch operation.

The finger touch operation can be a single-finger touch operation or a multi-finger touch operation, which can be distinguished by the number of touch points.

In an example implementation, the distinction between a single-finger and multi-finger touch operation is mainly based on pointerCount of the underlying operation. If current pointerCount is greater than or equal to 2, a multi-finger touch is determined, and if current pointerCount is 1, a single-finger touch is determined.

As described herein, in an Android system, getPointerCount in MotionEvent class can be used to obtain the number of touch points. If the return value is 1, it indicates that one finger has pressed the screen, and if the return value is 2, it indicates that two fingers have pressed the screen simultaneously.

Optionally, the finger touch operation can also include information such as a state of the touch point, a coordinate of the touch point, a touch pressure value, and a touch fingerprint.

Optionally, the finger touch operation can also include the angle and speed of the finger sliding.

As described herein, the state of the touch point of the current operation can be obtained through eventgetAction( ). The operations of single-point pressing, releasing, and moving are MotionEventACTION_DOWN, ACTION_UP, and ACTION_MOVE.

The coordinate of the touch point can be obtained through eventgetX( ) and eventgetY( ). If there are multiple touch points, the coordinate value of the first point is obtained through eventgetX(0) and eventgetY(0), the coordinate value of the second point is obtained through eventgetX(1) and eventgetY(1), and so on and so forth if there are more than two points.

When the touch operation is a pen touch operation, the interactive flat panel receives the pen touch operation on the interface of the writing application, and obtains the touch contact area of the pen touch operation.

The pen touch operation can be a thick pen touch operation or a fine pen touch operation, which can be distinguished by the touch contact area.

In an example implementation, the distinction is made by comparing the touch contact area with a preset area threshold. If the current touch contact area is less than or equal to the preset area threshold, a fine pen touch is determined, and if the current touch contact area is greater than the preset area threshold, a thick pen touch is determined.

Optionally, the pen touch operation can also include information such as the state of the touch point, the coordinate of the touch point, and the touch pressure value.

As described herein, the touch point state of the current operation can be obtained through event getAction( ). The operations of pressing, releasing and moving are MotionEventACTION_DOWN, ACTION_UP, and ACTION_MOVE.

The coordinate of the touch point can be obtained through eventgetX( ) and eventgetY( ). If there are multiple touch points, the coordinate value of the first point is obtained through eventgetX(0) and eventgetY(0), the coordinate value of the second point is obtained through eventgetX(1) and eventgetY(1), and so on and so forth if there are more than two points.

At S303, when the touch operation is of a first type, a response is provided to the touch operation on the interface of the preset format document.

The first type can be any operation type, and can be categorized based on the touch information associated with the touch operation.

For example, when the touch information includes the number of touch points, the first type can be equal to 1, greater than 1, greater than or equal to 1 and less than or equal to 3, and/or the like.

As another example, when the touch information includes the touch contact area, the first type can be greater than or equal to a preset area threshold, less than the preset area threshold, within a preset area threshold range, outside the preset area threshold range, and/or the like.

By comparing the touch information of the touch operation with the first type, if there is a match, a response is provided to the touch operation on the interface of the presser format document. If the interface of the presser format document is the interface at a lower layer, the response is performed on the interface at the lower layer, thereby realizing the touch penetration function.

In an example implementation, when the number of touch points meets a first number range, a finger touch operation is sent to the interface of the preset format document, and a response to the finger touch operation is provided on the interface of the preset format document.

The first number range can be any set range, with a value ranging from 0 to a preset number threshold, or from a preset number threshold to 10. In one or more embodiments of the present application, the first number range of 0~1 is taken as an example for description.

When the current number of touch points is detected to be 1, a single-finger touch is determined, and the finger touch operation is sent to the interface of the preset format document located at the lower layer of the two overlapping interfaces.

Optionally, when the number of touch points meets the first number range, the terminal also sends the finger touch operation to the interface of the writing application at the same time, and responds to the finger touch operation on the interface of the preset format document and the interface of the writing application at the same time.

In an example implementation, when it is detected that the current touch contact area meets the first area range, a fine pen touch is determined, and a pen touch operation is sent to the interface of the preset format document located at the lower layer of the two overlapping interfaces.

The first area range is any set value range, which can be less than or equal to the preset area threshold, or greater than the preset area threshold.

Optionally, when the touch contact area meets the first area range, the terminal also sends the pen touch operation to the interface of the writing application at the same time, and responds to pen finger touch operation on the interface of the preset format document and the interface of the writing application at the same time.

As described herein, operation sending refers to the process in which after a touch operation (MotionEvent) is generated, the system needs to send the touch operation to a view (View). In one or more embodiments of the present application, the operation sending is to send the finger touch operation or the pen touch operation to the interface of the preset format document.

In an Android system, the operation sending can be understood as follows: the user touches the display screen to generate a touch operation (MotionEvent), the operation is received by Activity, and the operation is transmitted by Activity after being received. The transmission process is as follows: Activity→Window→DecorView (where Decor-View is the underlying container of the current interface, which is ViewGroup)→executing dispatchTouchEvent( ) of ViewGroup, wherein dispatchTouchEvent( ) is used to send the operation.

Responding to the touch operation on the interface of the preset format document can be understood as processing or consuming the operation information of the touch operation on the interface of the preset format document.

In an Android system, onTouchEvent( ) can be called in dispatchTouchEvent( ), and whether the finger touch operation is consumed is determined by a returned value. If the returned value is false, no consumption is indicated, and in the same operation (touch operation) sequence, the interface (view on the interface) will not receive the operation again. If the returned value is true, consumption is indicated.

In an example implementation, the terminal sends the operation information of the touch operation to the interface of the writing application located at an upper layer and the interface of the presser format document located at a lower layer, respectively. For the writing application, onTouchEvent( ) is called in dispatchTouchEvent( ), and false is returned At this time, the following operations are triggered: for the interface of the presser format document, calling onTouchEvent( ) in dispatchTouchEvent( ), responding to the touch operation and returning true. Thus, it realizes a penetration response to the touch operation on the overlapping interface.

At S304, when the touch operation is of the second type, a response to the touch operation is provided on the interface of the writing application.

The second type is different from the first type, and is similarly categorized according to the touch information. The second type and the first type can be categorized based on the same touch information, or can be categorized based on different touch information.

For example, the second type and the first type can be categorized based on the number of touch points. The first type is a first preset number, the second type is a second preset number, and the first preset number is different from the second preset number.

For another example, the second type can be categorized based on the number of touch points, and the first type can be categorized based on the touch contact area.

By comparing the touch information of the touch operation with the second type, if the comparison is consistent, a response to the touch operation is provided on the interface of the writing application. If the interface of the writing application is the interface at the upper layer, the response is performed on the interface at the upper layer, thereby realizing the basic response of the touch operation on the interface.

In an example implementation, an identifier adding request initiated for the interface of the writing application is obtained, and an attribute identifier is added on the interface of the writing application based on the identifier adding request. When the touch operation is of the second type, the touch operation sent to the interface of the preset format document is intercepted. When the touch operation is sent back to the interface of the writing application corresponding to the attribute identifier, a response to the touch operation on the interface of the writing application is triggered.

As described herein, the attribute identifier is used to uniquely identify the interface of the writing application, and can include TAG identifier, ID, etc. The purpose of adding the attribute identifier to the interface of the writing application is to facilitate the search for the interface of the writing application, so that the interface of the writing application can be quickly determined as a directional interface.

A user may perform an editing operation of the interface of the writing application to generate an identifier adding request. After receiving the request, the terminal interactive flat panel adds an attribute identifier to the interface of the writing application. The attribute identifier can be added to any display area of the writing application interface, such as the upper left corner. The added attribute identifier can be found in the underlying identifier library, or can be currently generated.

In an example implementation, each interface has an attribute identifier, and each attribute identifier is represented by a set of binary codes, which can include multiple bits (such as 32 bits). The attribute identifier of the interface of the writing application can be found in the underlying identifier library and marked on the interface of the writing application.

For example, Table 1 shows attribute identifiers of each interface stored in an underlying identifier library, and the attribute identifier of the interface of the writing application can be obtained as 001011 . . . 1 by searching Table 1.

TABLE 1

| Interface | Attribute identifier |
| --- | --- |
| Interface of the preset format document | 100001 . . . 1 |
| Interface of the writing application | 001011 . . . 1 |
| Third interface | 110011 . . . 0 |
| . . . | . . . |

When the number of touch points meets a second number range, the finger touch operation is sent to the interface of the writing application, wherein the second number range is different from the first number range.

The second number range is any number range different from the first number range, similarly, with a value ranging from 0 to a preset number threshold, or from a preset number threshold to 10. The first number range can be greater than the second number range, or can be smaller than the second number range. In one or more embodiments of the present application, the second number range greater than 1 is taken as an example for description.

When it is detected that the current number of touch points is 1, a multi-finger touch is determined, and the finger touch operation is sent to the interface of the writing application located at the upper layer of the two overlapping interfaces.

As described herein, the directional transmission of the finger touch operation can be performed based on the attribute identifier of the interface of the writing application.

After the finger touch operation is sent to the interface of the writing application, the finger touch operation sent to the interface of the preset format document is intercepted and sent back, and the operation sending process is ended, so as to trigger a response to the finger touch operation on the interface of the writing application. As described herein, for an Android system, onInterceptTouchEvent( ) can be called in dispatchTouchEvent( ) to intercept the finger touch operation.

The finger touch operation responded on the interface of the writing application can include multiple operations such as page-turning, writing, roaming, and opening another page.

When the touch contact area meets a second area range, the pen touch operation is sent to the interface of the writing application.

The second area range is any range that is different from the first area range, and can be less than or equal to the preset area threshold, or greater than the preset area threshold. In one or more embodiments of the present application, when the first area range is less than or equal to the preset area threshold, the second area range is greater than the preset area threshold.

When it is detected that the current touch contact area meets the second area range, a thick pen touch is determined, and the pen touch operation is sent to the interface of the writing application located at the upper layer of the two overlapping interfaces.

In one or more embodiments of the present application, a play mode interface of a preset format document and an interface of a writing application are displayed on an interactive flat panel, and the interface of the writing application is a transparent layer covering the interface of the preset format document. A touch operation on the interface of the writing application may be received. When the touch operation is of a first type, page-turning of the preset format document is performed, and when the touch operation is of a second type, the preset format document is annotated on the interface of the writing application. In an Android system, touch events are usually abstracted and simplified into three types: pressing, moving, and lifting. For example, when a finger is pressed in a certain area, the Android system may send the touch event to the application in the topmost window of the area. Subsequent moving and lifting touch events are handed over to the application for processing, and the touch events are not sent to other applications covered by the window. As a result, the problem described in background section of the disclosure will occur, which makes it necessary to exit the annotation function to continue to operate the slide. In one or more embodiments of the present application, because an Android platform of the interactive flat panel can modify an operation sending logic of the system, it is possible to implement touch operations on the interface of the writing application to perform page-turning of the preset format document, which reduces the difficulty of operating the interface of the lower layer by touching the interface of the upper layer in the scene that two display interfaces are overlapped. There is no need to exit the annotation interface, and it only needs to recognize the operation type of the touch operation on the interface of the writing application, so as to trigger to directly control the slide in the case that the annotation interface has been started. The operation is convenient and quick, which improves the convenience of the slide operation after calling the annotation interface.

Figure 14:
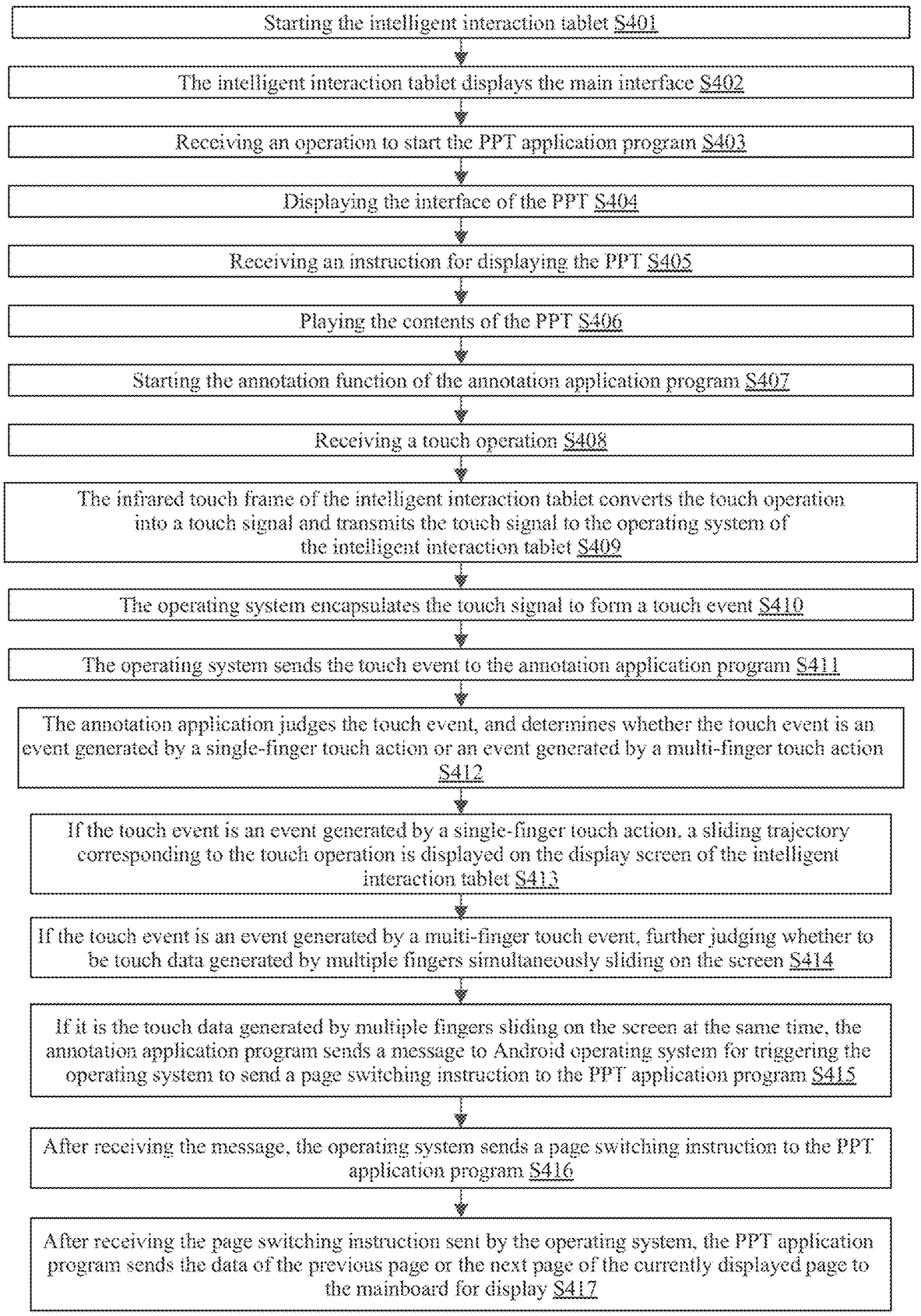
FIG. 14 is a schematic flowchart illustrating a method of an interactive flat panel provided by an embodiment of the present application.

Referring to FIG. 14, which is a flowchart of an operation method of an interactive flat panel disclosed in an embodiment of the present application. In this embodiment, the interactive flat panel uses an infrared touch frame to receive touch data on the screen, the method includes the following steps.

At S401, an interactive flat panel is started.

The interactive flat panel refers to an integrated device that controls the content displayed on the interactive flat panel (LCD, LED, PDP) through a touch technology and realizes human-computer interaction.

The interactive flat panel is usually a large-screen display device. A physical switch button can be set on the interactive flat panel, and the interactive flat panel can be turned on or off by pressing the physical switch button. Starting the interactive flat panel is to power on the interactive flat panel, thereby illuminating the display screen of the interactive flat panel.

Figure 15:
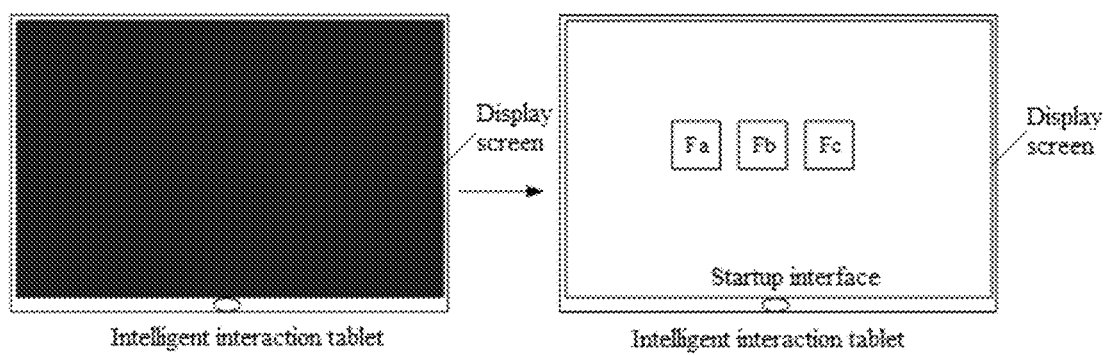
FIG. 15 is a schematic diagram of an interface before and after the startup of an interactive flat panel provided by an embodiment of the present application.

When the interactive flat panel is in the shutdown state, the display screen shows a black screen, as shown in the left picture in FIG. 15.

Optionally, the starting of the interactive flat panel can also be controlled by means of voice control, fingerprints, etc.

At S402, the interactive flat panel displays the main interface.

After the display screen of the interactive flat panel is illuminated, the startup interface is displayed. The startup interface can be the main interface of the operating system of the interactive flat panel, wherein the operating system can be an Android operating system.

At the same time, on the display interface, an application icon for starting the PPT application program can also be displayed. The application icon can be an icon of a created PPT document, and can include one or more PPT documents, each of which corresponds to a document name. The application icon can also be the icon of an installed PPT application program. An empty PPT can be opened through the application icon, and then a PPT document can be obtained by editing and saving.

For example, when the interactive flat panel is started, the operating system interface (the default startup interface) displayed on the display screen may be as shown on the right side of FIG. 15.

At S403, an operation to start the PPT application program may be received or detected.

The user can click the icon of the PPT application program on the interactive flat panel to start the application program, or when receiving an external signal, the interactive flat panel automatically starts the PPT application program. The external signal can be a voice signal, a gesture operation signal controlled by a camera control, and/or the like.

Optionally, when the icon of the PPT application program is not displayed on the main display interface, the PPT application program can be started by screen transmission, by opening a local slide, or by opening a slide in a removable disk.

At S404, the interface of the PPT may be displayed.

The interface of the displayed PPT can be the first page of the PPT, the page that was shown when the PPT was closed last time, or the default page that can be shown based on a preset rule.

It should be noted that the PPT can include multiple-page display contents, and each page of display contents can be understood as an image. The contents displayed on the current page of the PPT are set as the first image.

At S405, an instruction for playing the PPT may be received.

If the PPT is started directly through the icon of the PPT application program on the main interface, the normal mode interface of the PPT is shown at this time. By clicking play on the interface of the PPT and selecting the play start page, such as "play slide-start from the current slide", it is possible to control the initial PPT play interface.

If opening is performed by screen transmission, when the slide displayed on the mobile device is displayed in the play mode, the play mode of the slide is also displayed on the interactive flat panel.

If opening is performed through the local slide or through the slide in the removable disk, the way to control the initial PPT play interface is the same as the way to start the PPT directly through the icon of the PPT application program on the main interface.

At S406, the PPT contents may be played.

After the user inputs a play instruction, the PPT is switched from the normal mode to the play mode.

The playing of the PPT contents can also be controlled based on a selection by the user. If the user selects the automatically play mode and "Playing from the beginning," and the play time interval is 10 s, the interactive flat panel controls the PPT contents to be played according to this rule. If the user selects the manually play mode and "Playing from the beginning," the home page of the PPT is currently displayed and remains as it is. When the user triggers to switch the play contents, the switched contents are displayed.

At S407, the annotation function of the annotation application program may be started.

When the PPT contents are played, an Android operating system can automatically start the annotation application program, and the annotation application program is a transparent layer covering the display interface of the slide. The Android operating system can use the accessibility service function to start the annotation application program at the same time of playing the PPT. In one or more embodiments, when it is detected that the PPT application program is started, the accessibility service function is started accordingly. The accessibility service continuously monitors the state of the PPT application program. When it is detected that the PPT application program is in the playing state, the accessibility service simultaneously starts an approved application program.

At S408, a touch operation may be received.

The touch operation is any type of touch action initiated by the user on the display screen, which can be performed by a direct touch with fingers, or a touch with a stylus. The touch action can be a pressing operation, a sliding operation, a clicking operation, and/or the like.

In one or more embodiments of the present application, the touch operation refers to a sliding operation with a finger. The sliding operation can include a single-finger sliding operation or a multi-finger sliding operation. The sliding operation is initiated on the interface of the annotation application, and is a horizontal or vertical sliding action relative to the border of the interface of the annotation application.

Figure 16A:
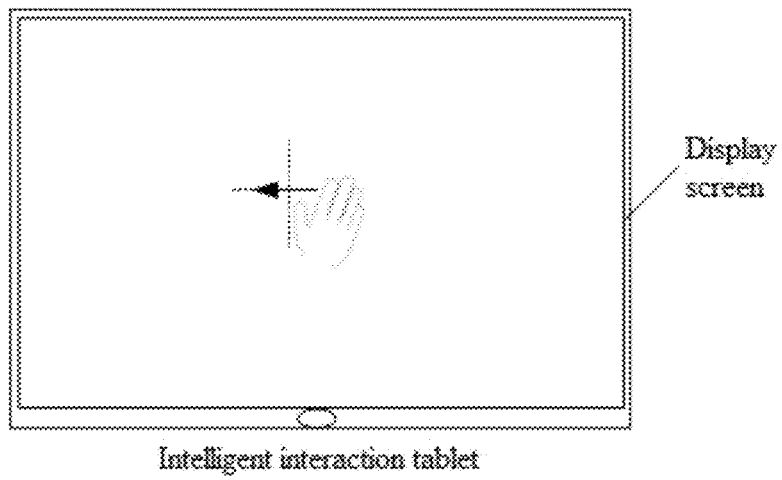
FIG. 16a is an effect schematic diagram illustrating a multi-finger sliding operation provided by an embodiment of the present application.

For example, as shown in FIG. 16a, when the sliding operation initiated by the user is to slide horizontally to the left relative to the border of the interface of the annotation application, the PPT can be performed page-turning and turned to the next page. If the sliding operation initiated by the user is to slide horizontally to the right relative to the border of the annotation application interface, the PPT can be turned to the previous page.

Figure 16B:
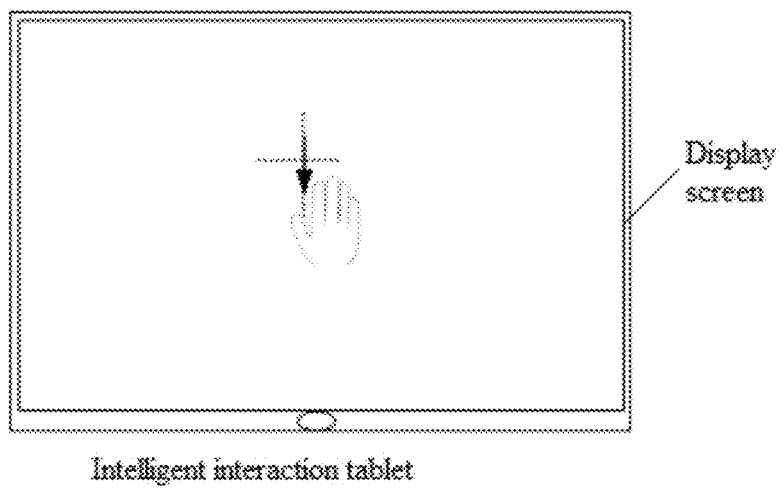
FIG. 16b is an effect schematic diagram of a multi-finger sliding operation provided by an embodiment of the present application.

For another example, as shown in FIG. 16b, when the sliding operation initiated by the user is to slide vertically downwards relative to the border of the interface of the annotation application, the PPT can be performed page-turning and turned to the next page. If the sliding operation initiated by the user is to slide vertically upwards relative to the border of the interface of the annotation application, the PPT can be turned to the previous page.

When the user touches the displayed interface of the annotation application, the touch sensing device of the interactive flat panel receives the touch operation on the interface of the annotation application.

At S409, the infrared touch frame of the interactive flat panel converts the touch operation into a touch signal and transmits the touch signal to the operating system of the interactive flat panel.

At S410, the operating system encapsulates the touch signal to form a touch event.

An operation receiving view is pre-created on the interface of the annotation application, and when the user inputs a touch operation on the operation receiving view, the interactive flat panel can recognize the touch operation.

In particular, the operating system runs on the mainboard and monitors the touch signal of the touch frame in real time.

As described herein, encapsulation is to map service data to the payload of a certain encapsulation protocol, fill the header of the corresponding protocol to form a data packet of the encapsulation protocol, and complete rate adaptation. In one or more embodiments of the present application, the service data is the touch signals, and the encapsulated data packet is the touch event.

When an application program (annotation application program and/or PPT application program) receives a touch event, it is necessary to perform de-encapsulation on the touch event and determine whether to respond. De-encapsulation is the reverse process of encapsulation, in which the protocol package is disassembled, the information in the header is processed, and the service information in the payload is taken out.

At S411, the operating system sends the touch event to the annotation application program.

In an Android system, the operation sending can be understood as follows: the user touches the display screen to generate a touch operation (MotionEvent), the operation is by Activity, and the operation is transmitted by Activity after being received. The transmission process is as follows: Activity→Window→DecorView (DecorView is the underlying container of the current interface, which is ViewGroup)→executing dispatchTouchEvent( ) of ViewGroup, wherein dispatchTouchEvent( ) is used to send the operation.

According to the setting of the operating system, the Android system sends the touch event to the application with the attribute identifier corresponding to the topmost window of the area. In one or more embodiments of the present application, the annotation application is located at the topmost layer of the window.

At S412, the annotation application evaluates the touch event, and determines whether the touch event is an event generated by a single-finger touch action or an event generated by a multi-finger touch action.

Determining whether the event is an event generated by a single-finger touch action or an event generated by a multi-finger touch action can be distinguished by the number of touch points.

In an example implementation, the distinction between single-finger and multi-finger is mainly based on pointerCount of the underlying operation. If current pointerCount is greater than or equal to 2, a multi-finger touch is determined, and if current pointerCount is 1, a single-finger touch is determined.

As described herein, in an Android system, getPointerCount in MotionEvent class can be used to obtain the number of touch points. If 1 is returned, it indicates that one finger has pressed the screen, and if 2 is returned, it indicates that two fingers have pressed the screen simultaneously.

At S413, if the touch event is an event generated by a single-finger touch action, a sliding trajectory corresponding to the touch operation is displayed on the display screen of the interactive flat panel.

When the interactive flat panel detects that the touch operation is a single-finger sliding operation, the added attribute identifier is modified or hidden to indicate that the touch event does not need to be penetrated, then the touch event is sent to the annotation application, and the sliding trajectory initiated by the user is displayed synchronously, wherein the sliding trajectory is displayed on the interface of the annotation application. The touch event sent to the PPT application is intercepted, and at the same time, the played display content of the PPT remains as it is.

A feasible approach is to send the touch operation to the annotation application and the PPT. For the annotation application, onTouchEvent( ) is called in dispatchTouchEvent( ), the touch operation is responded, and true is returned. For the PPT, onTouchEvent( ) is called in dispatchTouchEvent( ), the touch operation is not responded, and false is returned.

For the slide document, onTouchEvent( ) is called in dispatchTouchEvent( ), the touch operation is not responded, and false is returned. Further, onInterceptTouchEvent( ) is called in dispatchTouchEvent( ) to intercept the touch operation.

At S414, if the touch event is an event generated by a multi-finger touch action, a determination is made regarding whether touch data are generated by multiple fingers simultaneously sliding on the screen.

The event generated by a multi-finger touch action may be an event generated by multiple fingers sliding on the screen at the same time, or an event generated by multiple fingers sliding sequentially within a preset time period. In one or more embodiments of the present application, in order to determine that the multi-finger touch action is generated by multiple fingers sliding on the screen at the same time, it is necessary to phrase the generated touch data. The touch data can include the sliding trajectory of each finger, the contact duration of each finger with the screen, and the like. A confirmation may be made by comparing the sliding trajectory of each finger and/or the contact time with the screen.

The multi-finger sliding operation may be a sliding operation of at least two fingers on the interface of the annotation application at the same time, and the multi-finger sliding operation may be to slide from top to bottom or from bottom to top, or from right to left or from left to right relative to the interface of the annotation application.

At S415, if the multi-finger touch action correspond to touch data generated by multiple fingers sliding on the screen at the same time, the annotation application program sends a message to the Android operating system to trigger the operating system to send a page switching instruction to the PPT application program.

The annotation application can encapsulate the touch data generated by multiple fingers sliding on the screen at the same time into direction events (as if up, down, left, and right buttons are pressed) generated by device such as a keyboard or a remote control, and send the direction event to the operating system to trigger the operating system to send a page switching instruction to the PPT application program.

At S416, after receiving the message, the operating system sends a page switching instruction to the PPT application program.

At S417, after receiving the page switching instruction sent by the operating system, the PPT application program sends the data of the previous page or the next page of the currently displayed page to the mainboard for display.

In an example implementation, the touch operation is sent to the annotation application and the PPT application respectively. For the annotation application, onTouchEvent( ) is called in dispatchTouchEvent( ), the touch operation is not responded to, and false is returned. For the PPT application, onTouchEvent( ) is called in dispatchTouchEvent( ), the touch operation is responded to, and true is returned.

In one or more embodiments of the present application, the main interface of the system is displayed after the interactive flat panel is started, and the PPT application program on the main interface is started by a touch. When PPT is controlled to display the play mode, the annotation application is synchronously started, and then the touch operation initiated on the interface of the annotation application is recognized to realize the page-turning control of the PPT and the annotation control of the PPT, respectively. In an Android system, touch events are usually abstracted and simplified into three types: pressing, moving, and lifting. For example, when a finger is pressed in a certain area, the Android system may send the touch event to the application in the topmost window of the area. Subsequent moving and lifting touch events are handed over to the application for processing, and the touch events are not sent to other applications covered by the window. As a result, the problem described in background of the invention will occur, which makes it necessary to exit the annotation function to continue to operate the slide. In one or more embodiments of the present application, because Android platform of the interactive flat panel can modify an operation sending logic of the system, it is possible to implement touch operations on the interface of the annotation application to perform page-turning of the slide document. This reduces the difficulty of operating the interface of the lower layer by touching the interface of the upper layer in the scene that two display interfaces are overlapped. There is no need to exit the annotation interface, and it only needs to recognize the operation type of the touch operation on the interface of the annotation application, so as to trigger to directly control the slide in the case that the annotation interface has been started. The operation is convenient and quick, which improves the convenience of the slide operation after calling the annotation interface.

Hereinafter, a device in accordance with one or more embodiments of the present application will be described, which can be used to implement the method described herein. Details not disclosed in the device description can be found in description of the methods provided herein.

Figure 17:
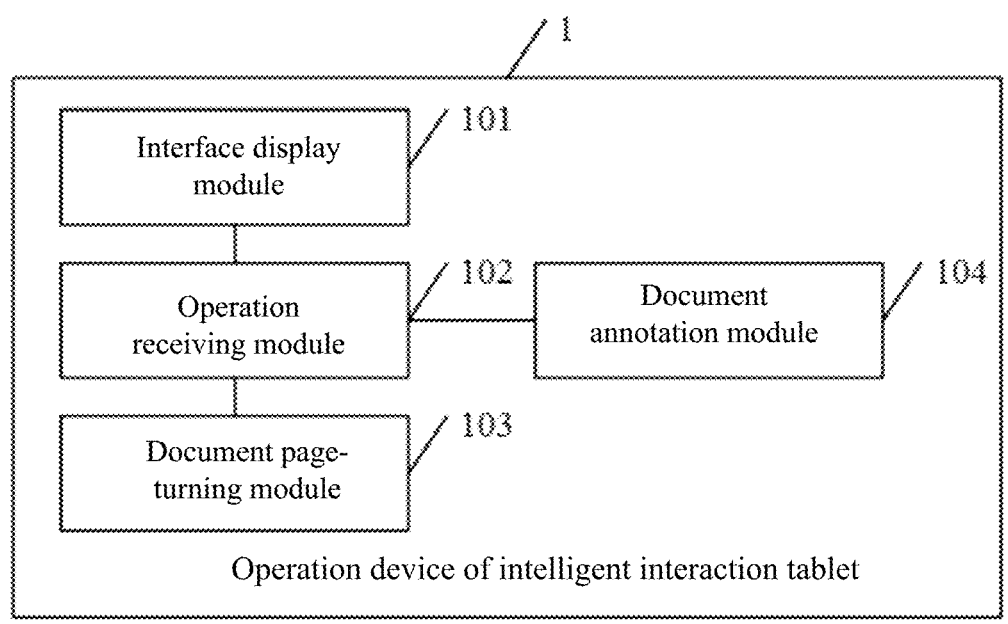
FIG. 17 is a schematic structure diagram of an operation device of an interactive flat panel provided by an embodiment of the present application.

FIG. 17 shows a schematic structure diagram of an operation device of an interactive flat panel provided by an exemplary embodiment of the present application. The operation device of the interactive flat panel can be implemented as all or part of the interactive flat panel through software, hardware, or a combination of both. The device includes an interface display module 101, an operation receiving module 102, a document page-turning module 103, and a document annotation module 104.

The interface display module 101 is configured to display a play mode interface of a slide document and an interface of an annotation application, wherein the interface of the annotation application is a transparent layer covering the interface of the slide document.

The operation receiving module 102 is configured to receive a touch operation on the interface of the annotation application.

The document page-turning module 103 is configured to, when the touch operation is of a first type, perform page-turning of the slide document.

The document annotation module 104 is configured to, when the touch operation is of a second type, annotate the slide document on the interface of the annotation application.

Optionally, the first type is a multi-finger touch operation, and the second type is a single-finger touch operation.

Figure 18:
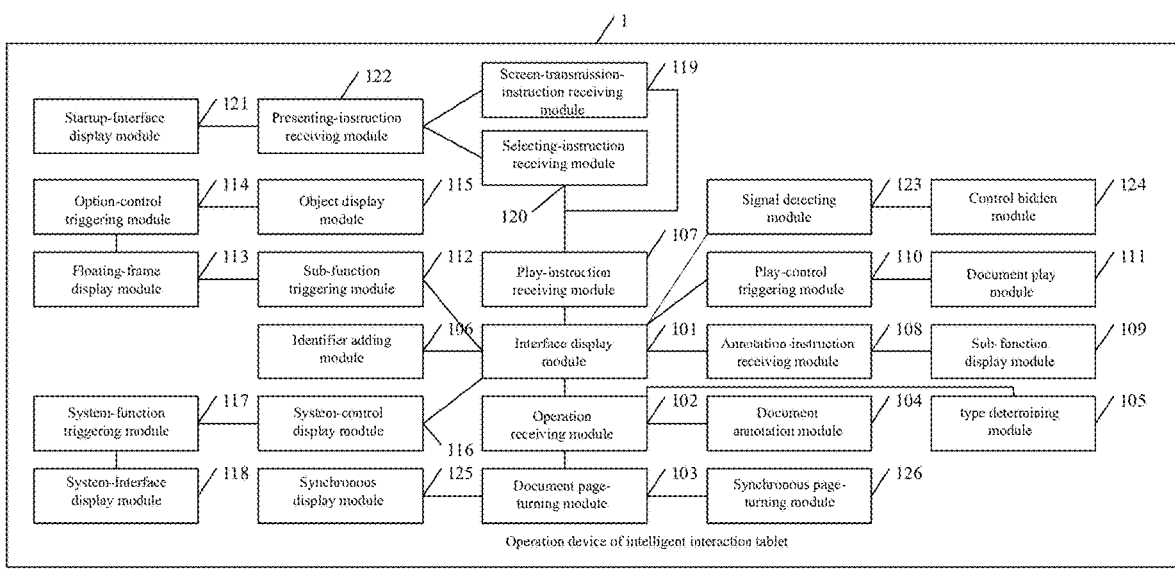
FIG. 18 is a schematic structure diagram of an operation device of an interactive flat panel provided by an embodiment of the present application.

Optionally, as shown in FIG. 18, the operating system of the interactive flat panel is an Android system. In the Android system, the device further includes a type determining module 105 configured to use getPointerCount in MotionEvent class to obtain the number of touch points corresponding to the touch operation. If PointerCount is greater than or equal to 2, the touch operation is determined as the multi-finger touch operation. If PointerCount is 1, the touch operation is determined as the single-finger touch operation.

Optionally, as shown in FIG. 18, the device further includes:
an identifier adding module 106 configured to obtain an identifier adding request initiated for the interface of the annotation application, and to add an attribute identifier on the interface of the annotation application based on the identifier adding request.

Optionally, the document page-turning module 103 is configured to:
when the touch operation is of the first type, send the touch operation to the interface of the slide document, and perform page-turning of the slide document.

Optionally, the document page-turning module 103 is configured to:
send the touch operation to the annotation application and the slide document respectively. For the annotation application, call onTouchEvent( ) in dispatchTouchEvent( ), give no response to the touch operation, and return false; for the slide document, call onTouchEvent( ) in dispatchTouchEvent( ), respond to the touch operation, and return true.

Optionally, the document annotation module 104 is configured to:
when the touch operation is of the second type, intercept the touch operation sent to the interface of the slide document, and
when the touch operation is sent back to the interface of the annotation application corresponding to the attribute identifier, trigger to annotate the slide document on the interface of the annotation application.

Optionally, the operating system of the interactive flat panel is an Android system, and the document annotation module 104 is configured to:
send the touch operation to the annotation application and the slide document respectively. For the annotation application, call onTouchEvent( ) in dispatchTouchEvent( ), respond to the touch operation, and return true; for the slide document, call onTouchEvent( ) in dispatchTouchEvent( ), give no response to the touch operation, and return false.

Optionally, the operating system of the interactive flat panel is an Android system, and the document annotation module 104 is configured to call onInterceptTouchEvent( ) in dispatchTouchEvent( ) to intercept the touch operation.

Optionally, as shown in FIG. 18, the device further includes:
a play-instruction receiving module 107 configured to receive a play instruction for triggering the slide document.

Optionally, the interface display module 101 is configured to:
display the play mode interface of the slide document and the interface of the annotation application, and
display a slide play control list and an annotation control on the interface of the annotation application, display the slide play control list at a first preset position of the interface of the annotation application, and display the annotation control at a second preset position of the interface of the annotation application, wherein the first preset position is adjacent to the second preset position, each play control in the slide play control list is used to perform a playing operation on the slide document, and the annotation control is used to perform an annotation operation on the slide document.

Optionally, the slide play control list includes at least one of following function controls:
a page-forward function control, a page-backward function control, or an end-play function control.

Optionally, as shown in FIG. 18, the device further includes:
an annotation-instruction receiving module 108 configured to receive an instruction for triggering the annotation control, and
a sub-function display module 109 configured to hide the annotation control, and display sub-function controls corresponding to the annotation control at the second preset position.

Optionally, the sub-function controls corresponding to the annotation control include at least one of following function controls:
an exit annotation function control, a share function control, a storage function control, an erase function control, a color selecting function control, or a handwriting-thickness selecting function control.

Optionally, the interface display module 101 is configured to:
display the slide play control list at an edge position of the interface of the annotation application, and display the annotation control at an edge position of the interface of the annotation application.

Optionally, as shown in FIG. 18, the device further includes:
a play-control triggering module 110 configured to receive an instruction for triggering a play control in the slide play control list, and
a document play module 111 configured to play the slide document based on the triggered play control.

Optionally, as shown in FIG. 18, the device further includes:
a sub-function triggering module 112 configured to receive an instruction for triggering the sub-function controls, and
a floating-frame display module 113 configured to display a floating frame, wherein the floating frame is displayed on the interface of the annotation application, and the floating frame includes an option control corresponding to the triggered sub-function control.

Optionally, as shown in FIG. 18, the device further includes:
an option-control triggering module 114 configured to receive an instruction for triggering the option control in the floating frame, and
an object display module 115 configured to display a target object corresponding to the triggered option control, wherein the target object is displayed on the interface of the annotation application.

Optionally, as shown in FIG. 18, the device further includes:
a system-control display module 116 configured to display a system function control list on the interface of the annotation application, and display the system function control list at the third preset position of the interface of the annotation application, wherein the system function control list includes a system function control for instructing the switch to a system default interface.

Optionally, as shown in FIG. 18, the device further includes:
a system-function triggering module 117 configured to receive an instruction for triggering the system function control, and
a system-interface display module 118 configured to display the system default interface.

Optionally, the system-control display module 116 is configured to:
display the system function control list at an edge position of the interface of the annotation application.

Optionally, the play control and/or the annotation control are displayed in the form of icons and/or texts.

Optionally, as shown in FIG. 18, the device further includes:
a screen-transmission-instruction receiving module 119 configured to receive a wireless screen transmission instruction, and display a normal mode interface of the slide document, or,
a selecting-instruction receiving module 120 configured to receive a local document selecting instruction, and display the normal mode interface of the slide document, wherein:
the selecting-instruction receiving module 120 may be further configured to receive a document selecting instruction of a removable disk, and display the normal mode interface of the slide document.

Optionally, as shown in FIG. 18, the device further includes:
a startup-interface display module 121 configured to display a startup interface of the interactive flat panel, wherein the startup interface includes a PowerPoint presentation control, and
a presenting-instruction receiving module 122 configured to receive an instruction for triggering the PowerPoint presentation control, and display sub-function controls corresponding to the PowerPoint presentation control.

Optionally, as shown in FIG. 18, the device further includes:
a signal detecting module 123 configured to receive no touch signal within a preset time period after the slide play control list and the annotation control are displayed, and
a control hidden module 124 configured to hide the slide play control list and the annotation control.

Optionally, as shown in FIG. 18, the device further includes:
a synchronous display module 125 configured to display contents of the document after the page is turned, and synchronously display an annotation handwriting corresponding to the contents of the document after the page is turned.

Optionally, as shown in FIG. 18, the device further includes:
a synchronous page-turning module 126 configured to, when a page-turning instruction is received, synchronously perform page-turning of the slide document and the annotation application.

It should be noted that when the operation device of the interactive flat panel provided in the above-mentioned embodiments executes the operation methods of the interactive flat panel, the division of the above-mentioned function modules is used only as an example. In actual implementations, the above-mentioned functions can be allocated according to needs, and completed by different functional modules. That is, the internal structure of the device may be divided into different functional modules to complete all or part of the functions described above. In addition, the operation device of the interactive flat panel provided in the above embodiments and the embodiments of the operation methods of the interactive flat panel belong to the same concept. The implementation details of the device may be determined by referring to the method embodiments, and will not be repeated herein.

The reference numbers used in the above-mentioned embodiments of the present application are only for description, and do not represent the advantages or disadvantages of the embodiments.

In one or more embodiments of the present application, a play mode interface of a slide document and an interface of an annotation application are displayed on an interactive flat panel, and the interface of the annotation application is a transparent layer covering the interface of the slide document. A touch operation on the interface of the annotation application may be received. When the touch operation is of a first type, page-turning of the slide document is performed, and when the touch operation is of a second type, the slide document is annotated on the interface of the annotation application. In an Android system, touch events are usually abstracted and simplified into three types: pressing, moving, and lifting. For example, when a finger is pressed in a certain area, the Android system may send the touch event to the application in the topmost window of the area. Subsequent moving and lifting touch events are handed over to the application for processing, and the touch events are not sent to other applications covered by the window. As a result, the problem described in the background section of the application will occur, which makes it necessary to exit the annotation function to continue to operate the slide. In one or more embodiments of the present application, because an Android platform of the interactive flat panel can modify an operation sending logic of the system, it is possible to implement touch operations on the interface of the annotation application to perform page-turning of the slide document, which reduces the difficulty of operating the interface of the lower layer by touching the interface of the upper layer in the scene that two display interfaces are overlapped. There is no need to exit the annotation interface, and it only needs to recognize the operation type of the touch operation on the interface of the annotation application, so as to trigger to directly control the slide in the case that the annotation interface has been started. The operation is convenient and quick, which improves the convenience of the slide operation after calling the annotation interface. In addition, by displaying relevant controls on the interface of the annotation application, it is possible to facilitate operating the slide document, and quickly switching to other display interfaces. This design conforms to the habits of the user and improves the user experience while also improving the operating efficiency of the slide document.

Figure 19:
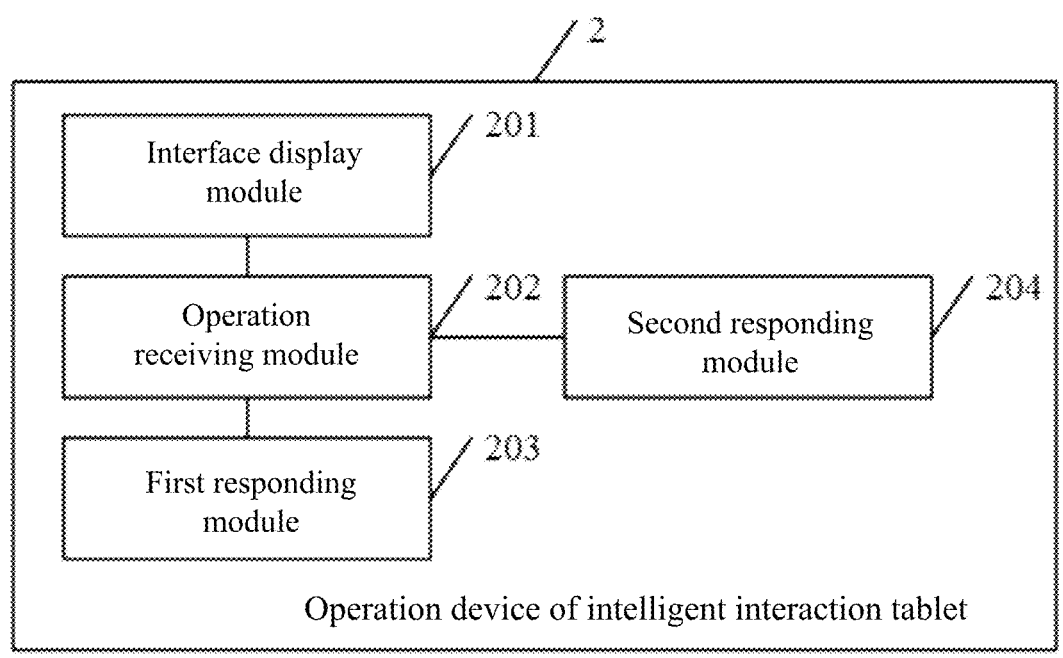
FIG. 19 is a schematic structure diagram of an operation device of an interactive flat panel provided by an embodiment of the present application.

FIG. 19 shows a schematic structure diagram of an operation device of an interactive flat panel provided by one or more embodiments of the present application. The operation device of the interactive flat panel can be implemented as all or part of the interactive flat panel through software, hardware, or a combination of both. The device includes an interface display module 201, an operation receiving module 202, a first responding module 203, and a second responding module 204.

The interface display module 201 is configured to display an interface of a preset format document and an interface of a writing application, wherein the interface of the writing application is a transparent layer covering the interface of the preset format document.

The operation receiving module 202 is configured to receive a touch operation on the interface of the writing application.

The first responding module 203 is configured to, when the touch operation is of a first type, respond to the touch operation on the interface of the preset format document.

The second responding module 204 is configured to, when the touch operation is of a second type, respond to the touch operation on the interface of the writing application.

Optionally, the operation receiving module 202 is configured to:
receive a finger touch operation on the interface of the writing application, and obtain the number of touch points of the finger touch operation.

The first responding module 203 is configured to:
when the number of touch points meets a first number range, send the finger touch operation to the interface of the preset format document, and respond to the finger touch operation on the interface of the preset format document.

The second responding module 204 is configured to:
when the number of touch points meets a second number range, send the finger touch operation to the interface of the writing application, and respond to the finger touch operation on the interface of the writing application, wherein the second number range is different from the first number range.

Optionally, the operating system of the interactive flat panel is an Android system. In the Android system, the operation receiving module 202 is configured to use getPointerCount in MotionEvent class to obtain the number of touch points corresponding to the finger touch operation. If PointerCount is greater than or equal to 2, the finger touch operation is determined as a multi-finger touch operation. If PointerCount is 1, the finger touch operation is determined as a single-finger touch operation.

Optionally, the operation receiving module 202 is configured to:
receive a pen touch operation in an overlap area, and obtain the touch contact area of the pen touch operation.

The first responding module 203 is configured to:
when the touch contact area meets a first area range, send the pen touch operation to the interface of the preset format document, and respond to the pen touch operation on the interface of the preset format document.

The second responding module 204 is configured to:
when the touch contact area meets a second area range, send the pen touch operation to the interface of the writing application, and respond to the pen touch operation on the interface of the writing application, wherein the second area range is different from the first area range.

Optionally, the second responding module 204 is configured to:
obtain a touch position of the pen touch operation, and input text information at the touch position on the interface of the writing application.

Optionally, the first responding module 203 is configured to:
send the touch operation to the writing application and the preset format document respectively. For the writing application, call onTouchEvent( ) in dispatchTouchEvent( ), give no response to the touch operation, and return false; for the preset format document, call onTouchEvent( ) in dispatchTouchEvent( ), respond to the touch operation, and return true.

Figure 20:
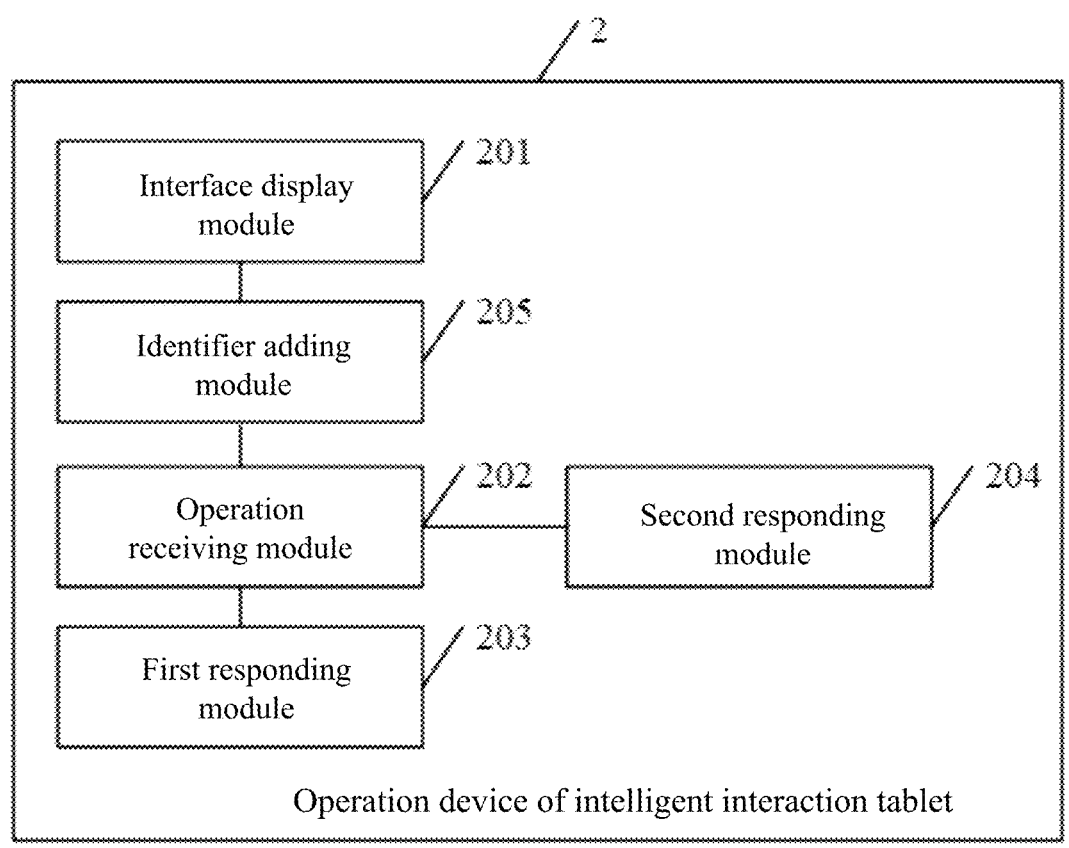
FIG. 20 is a schematic structure diagram of an operation device of an interactive flat panel provided by an embodiment of the present application.

Optionally, as shown in FIG. 20, the device further includes:
an identifier adding module 205 configured to obtain an identifier adding request initiated for the interface of the writing application, and add an attribute identifier on the interface of the writing application based on the identifier adding request.

The second responding module 204 is configured to:
intercept the touch operation sent to the interface of the preset format document, and when the touch operation is sent back to the interface of the writing application corresponding to the attribute identifier, trigger a response to the touch operation on the interface of the writing application.

Optionally, the operating system of the interactive flat panel is an Android system, and the second responding module 204 is configured to:
send the touch operation to the writing application and the preset format document respectively. For the writing application, call onTouchEvent( ) in dispatchTouchEvent( ), respond to the touch operation, and return true; for the preset format document, call onTouchEvent( ) in dispatchTouchEvent( ), give no response to the touch operation, and return false.

Optionally, the operating system of the interactive flat panel is an Android system, and the second responding module 204 is configured to call onInterceptTouchEvent( ) in dispatchTouchEvent( ) to intercept the touch operation.

It should be noted that when the operation device of the interactive flat panel provided in the above-mentioned embodiments executes the operation methods of the interactive flat panel, the division of the above-mentioned function modules is used only as an example. In actual implementations, the above-mentioned functions can be allocated according to needs, and completed by different functional modules. That is, the internal structure of the device may be divided into different functional modules to complete all or part of the functions described above. In addition, the operation device of the interactive flat panel provided in the above embodiments and the embodiments of the operation methods of the interactive flat panel belong to the same concept. Implementation details of the device may be determined by referring to the method embodiments, and will not be repeated herein.

The reference numbers of the above-mentioned embodiments of the present application are only for description, and do not represent the advantages or disadvantages of the embodiments.

In one or more embodiments of the present application, an interface of a preset format document and an interface of an writing application on an interactive flat panel are displayed, and the interface of the writing application is a transparent layer and covers the interface of the preset format document. A touch operation on the interface of the writing application may be received. When the touch operation is of a first type, page-turning is performed on the preset format document, and when the touch operation is of a second type, a response to the touch operation is provided on the interface of the writing application. Because Android platform of the interactive flat panel can modify an operation sending logic of the system, it is possible to implement touch operations on the interface of the writing application, so as to perform page-turning of the preset format document. This reduces the difficulty of operating the interface of the lower layer by touching the interface of the upper layer in the scene that two display interfaces are overlapped.

Figure 21:
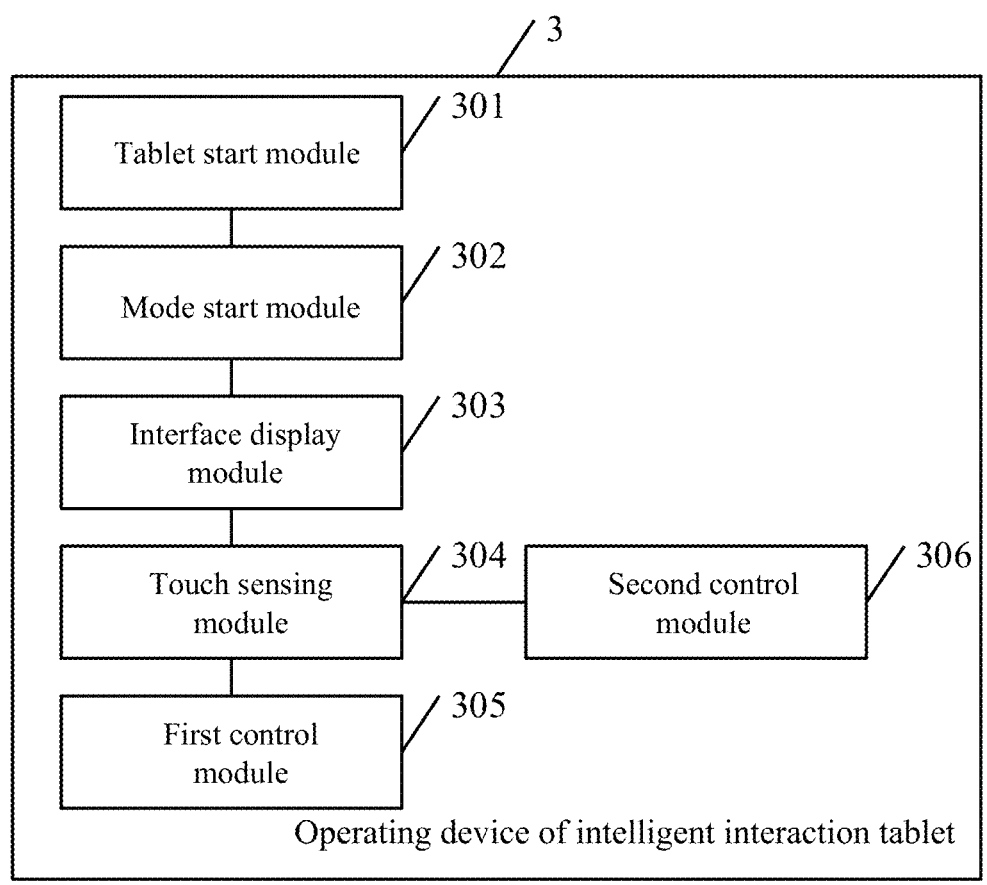
FIG. 21 is a schematic structure diagram of an operation device of an interactive flat panel provided by an embodiment of the present application.

FIG. 21 shows a schematic structure diagram of an operation device of an interactive flat panel provided by one or more embodiments of the present application. The operation device of the interactive flat panel can be implemented as all or part of the interactive flat panel through software, hardware, or a combination of both. The device includes a tablet start module 301, a mode start module 302, an interface display module 303, a touch sensing module 304, a first control module 305, and a second control module 306.

The tablet start module 301 is configured to start the interactive flat panel.

The mode start module 302 is configured to start a slide play mode of the interactive flat panel.

The interface display module 303 is configured to display a play mode interface of a slide document and an interface of an annotation application on a display screen of the interactive flat panel, wherein the interface of the annotation application is a transparent layer covering the interface of the slide document, and the play mode interface plays a first image of the slide document.

The touch sensing module 304 is configured to receive a touch operation on the interface of the annotation application, wherein the touch operation is a sliding operation of a finger on the interface of the annotation application, the sliding operation is a horizontal or vertical sliding action relative to a border of the interface of the annotation application.

The first control module 305 is configured such that, when the sliding operation is a single-finger sliding operation, an Android mainboard of the interactive flat panel controls the display screen of the interactive flat panel to display a sliding trajectory corresponding to the sliding operation. The first image of the slide document played through the play mode interface remains as it is.

The second control module 306 is configured such that, when the sliding operation is a multi-finger sliding operation, and if the multi-finger sliding operation is a sliding operation by at least two fingers on the interface of the annotation application at the same time, and the multi-finger sliding operation is performed from top to bottom or from right to left relative to the interface of the annotation application, the Android mainboard of the interactive flat panel controls the display screen to display a second interface of the slide document. The display screen does not display the sliding trajectory corresponding to the multi-finger sliding operation on the interface of the annotation application.

Optionally, the operating system of the interactive flat panel is an Android system, in the Android system, the touch sensing module 304 is configured to use getPointerCount in MotionEvent class to obtain the number of touch points corresponding to the touch operation. If PointerCount is greater than or equal to 2, the touch operation is determined as a multi-finger sliding operation. If PointerCount is 1, the touch operation is determined as a single-finger sliding operation.

Optionally, the second control module 306 is configured to:

send the touch operation to the annotation application and the slide document respectively. For the annotation application, call onTouchEvent( ) in dispatchTouchEvent( ), give no response to the touch operation, and return false; for the slide document, call onTouchEvent( ) in dispatchTouchEvent( ), respond to the touch operation, and return true.

Optionally, the operating system of the interactive flat panel is an Android system, and the first control module 305 is configured to:

send the touch operation to the annotation application and the slide document respectively. For the annotation application, call onTouchEvent( ) in dispatchTouchEvent( ), respond to the touch operation, and return true; for the slide document, call onTouchEvent( ) in dispatchTouchEvent( ), give no response to the touch operation, and return false.

Optionally, the operating system of the interactive flat panel is an Android system, and the first responding module 305 is configured to call onInterceptTouchEvent( ) in dispatchTouchEvent( ) to intercept the touch operation.

In one or more embodiments of the present application, in an Android system, touch events are usually abstracted and simplified into three types: pressing, moving, and lifting. For example, when a finger is pressed in a certain area, the Android system may send the touch event to the application in the topmost window of the area. Subsequent moving and lifting touch events are handed over to the application for processing, and the touch events are not sent to other applications covered by the window. As a result, the problem described in background of the invention will occur, which makes it necessary to exit the annotation function to continue to operate the slide. In one or more embodiments of the present application, because Android platform of the interactive flat panel can modify an operation sending logic of the system, it is possible to implement touch operations on the interface of the annotation application to perform page-turning of the slide document. This reduces the difficulty of operating the interface of the lower layer by touching the interface of the upper layer in the scene that two display interfaces are overlapped. There is no need to exit the annotation interface, and it only needs to recognize the operation type of the touch operation on the interface of the annotation application, so as to trigger to directly control the slide in the case that the annotation interface has been started. The operation is convenient and quick, which improves the convenience of the slide operation after calling the annotation interface.

An embodiment of the present application further provides a computer storage medium, wherein the computer storage medium stores a plurality of instructions, and the instructions are suitable for a processor to load and execute method steps of the above-mentioned embodiments as shown in FIGS. 1-16b. Reference of the execution process can be made to the description of the embodiments as shown in FIGS. 1-16b, which will not be repeated herein.

Figure 22:
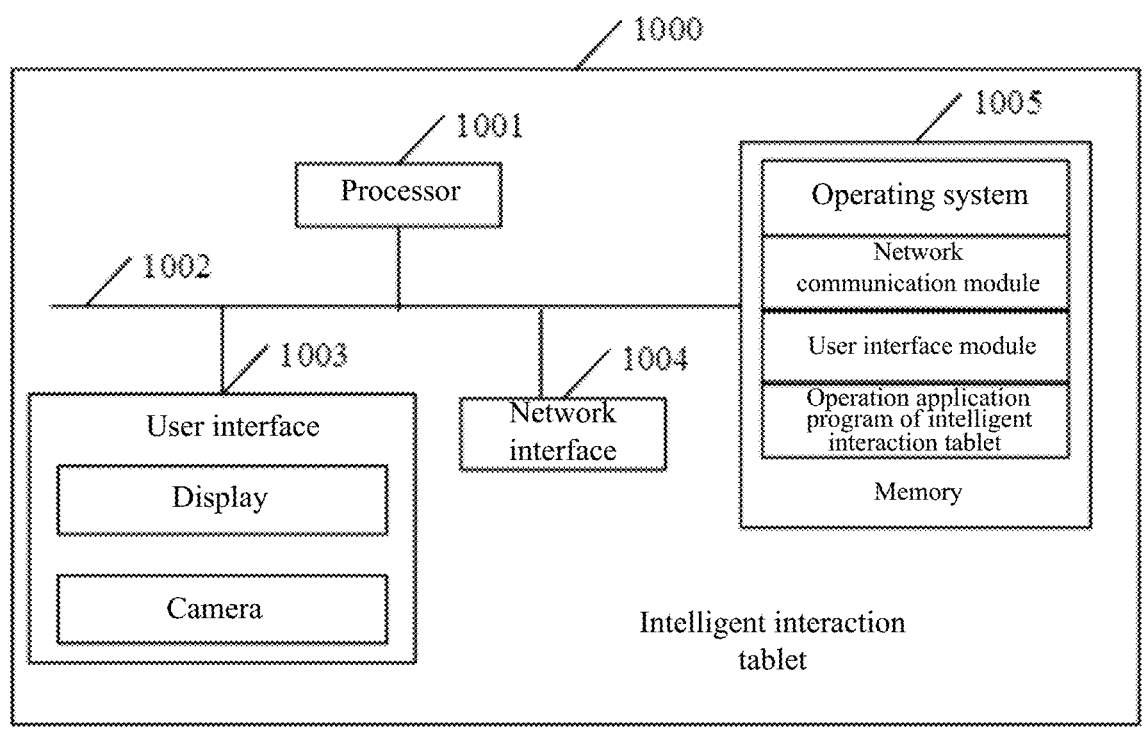
FIG. 22 is a schematic structure diagram of an interactive flat panel provided by an embodiment of the present application.

Referring to FIG. 22, which is a schematic structure diagram of an interactive flat panel provided by an embodiment of the present application. As shown in FIG. 22, an interactive flat panel 1000 can include: at least one processor 1001, at least one network interface 1004, a user interface 1003, a memory 1005, and at least one communication bus 1002.

As described herein, the communication bus 1002 is configured to implement connection communication between these components.

As described herein, the user interface 1003 can include a display and a camera, and optionally, the user interface 1003 can also include standard wired interface and wireless interface.

As described herein, the network interface 1004 can optionally include standard wired interface and wireless interface (such as a WI-FI interface).

As described herein, the processor 1001 can include one or more processing cores. The processor 1001 uses various interfaces and lines to connect various parts of the entire interactive flat panel 1000. By running or executing instructions, programs, code sets or instruction sets stored in the memory 1005, and calling data stored in the memory 1005, various functions of the interactive flat panel 1000 are performed, and data is processed. Optionally, the processor 1001 can be realized by using at least one of hardware forms: Digital Signal Processing (DSP), Field-Programmable Gate Array (FPGA), and Programmable Logic Array (PLA). The processor 1001 can be integrated with one or a combination of Central Processing Unit (CPU), Graphics Processing Unit (GPU), a modem, and the like. As described herein, CPU mainly processes the operating system, user interface, application programs, etc. GPU is responsible for rendering and drawing the content that the display screen needs to display. The modem is used to process wireless communication. It can be understood that the above-mentioned modem may not be integrated into the processor 1001, but can be implemented by a chip alone.

As described herein, the memory 1005 can include Random Access Memory (RAM), and can also include Read-Only Memory. Optionally, the memory 1005 includes a non-transitory computer-readable storage medium. The memory 1005 can be used to store instructions, programs, codes, code sets or instruction sets. The memory 1005 can include a program storage area and a data storage area, wherein the program storage area can store instructions for implementing the operating system, instructions for at least one function (such as touch function, sound play function, image play function, etc.), instructions for implementing the above-mentioned method embodiments, etc. The data storage area can store the data involved in the above-mentioned method embodiments, etc. Optionally, the memory 1005 can also be at least one storage device located far away from the above-mentioned processor 1001. As shown in FIG. 22, as a computer storage medium, the memory 1005 can include an operating system, a network communication module, a user interface module, and an operating application program of an interactive flat panel.

In the interactive flat panel 1000 as shown in FIG. 22, the user interface 1003 is mainly used to provide an input interface for the user to obtain data initiated by the user, and the processor 1001 can be used to call the operating application program of the interactive flat panel stored in the memory 1005, and perform the following operations:

displaying a play mode interface of a slide document and an interface of an annotation application, wherein the interface of the annotation application is a transparent layer covering the interface of the slide document, receiving a touch operation on the interface of the annotation application, when the touch operation is of a first type, performing page-turning of the slide document, and when the touch operation is of a second type, annotating the slide document on the interface of the annotation application.

In one embodiment, the first type is a multi-finger touch operation, and the second type is a single-finger touch operation.

In one embodiment, the operating system of the interactive flat panel is an Android system. In the Android system, the processor 1001 further executes the following steps: getPointerCount in MotionEvent class is used to obtain the number of touch points corresponding to the touch operation; if PointerCount is greater than or equal to 2, the touch operation is determined as the multi-finger touch operation; if PointerCount is 1, the touch operation is determined as the single-finger touch operation.

In one embodiment, the processor 1001 further executes the following steps:

obtaining an identifier adding request for the interface of the annotation application, and adding an attribute identifier on the interface of the annotation application based on the identifier adding request.

In one embodiment, if the touch operation is of the first type, when performing page-turning of the slide document, the processor 1001 executes the following steps:

when the touch operation is of the first type, sending the touch operation to the interface of the slide document, and performing page-turning of the slide document.

In one or more embodiments, the operating system of the interactive flat panel is an Android system, and if the touch operation is of the first type, when performing page-turning of the slide document, the processor 1001 executes the following steps:

sending the touch operation to the annotation application and the slide document respectively; for the annotation application, calling onTouchEvent( ) in dispatchTouchEvent( ), giving no response to the touch operation and returning false; for the slide document, calling onTouchEvent( ) in dispatchTouchEvent( ), responding to the touch operation and returning true.

In one or more embodiments, if the touch operation is of the second type, when annotating the slide document on the interface of the annotation application, the processor 1001 executes the following steps:

when the touch operation is of the second type, intercepting the touch operation sent to the interface of the slide document, and when the touch operation is sent back to the interface of the annotation application corresponding to the attribute identifier, triggering to annotate the slide document on the interface of the annotation application.

In one or more embodiments, the operating system of the interactive flat panel is an Android system, and if the touch operation is of the second type, when annotating the slide document on the interface of the annotation application, the processor 1001 executes the following steps:

sending the touch operation to the annotation application and the slide document respectively; for the annotation application, calling onTouchEvent( ) in dispatchTouchEvent( ), responding to the touch operation, and returning true; for the slide document, calling onTouchEvent( ) in dispatchTouchEvent( ), giving no response to the touch operation, and returning false.

In one or more embodiments, before displaying the play mode interface of the slide document and the interface of the annotation application, the processor 1001 further executes the following steps:
  receiving a play instruction for triggering the slide document.

In one or more embodiments, when displaying the play mode interface of the slide document and the interface of the annotation application, the processor 1001 executes the following steps:
  displaying the play mode interface of the slide document and the interface of the annotation application, and
  displaying a slide play control list and an annotation control on the interface of the annotation application, displaying the slide play control list at a first preset position of the interface of the annotation application, and displaying the annotation control at a second preset position of the interface of the annotation application, wherein the first preset position is adjacent to the second preset position, each play control in the slide play control list is used to perform a playing operation on the slide document, and the annotation control is used to perform an annotation operation on the slide document.

In one or more embodiments, the slide play control list includes at least one of following function controls:
  a page-forward function control, a page-backward function control, or an end-play function control.

In one or more embodiments, after displaying the slide play control list and the annotation control on the interface of the annotation application, the processor 1001 further executes the following steps:
  receiving an instruction for triggering the annotation control, and
  hiding the annotation control, and displaying sub-function controls corresponding to the annotation control at the second preset position.

In one or more embodiments, the sub-function controls corresponding to the annotation control include at least one of following function controls:
  an exit annotation function control, a share function control, a storage function control, an erase function control, a color selecting function control, or a handwriting-thickness selecting function control.

In one or more embodiments, when displaying the slide play control list at the first preset position of the interface of the annotation application, and displaying the annotation control at the second preset position of the interface of the annotation application, the processor 1001 executes the following steps:
  displaying the slide play control list at an edge position of the interface of the annotation application, and displaying the annotation control at an edge position of the interface of the annotation application.

In one or more embodiments, after displaying the slide play control list and the annotation control on the interface of the annotation application, the processor 1001 further executes the following steps:
  receiving an instruction for triggering a play control in the slide play control list, and
  playing the slide document based on the triggered play control.

In one or more embodiments, after hiding the annotation control, and displaying the sub-function controls corresponding to the annotation control at the second preset position, the processor 1001 further executes the following steps:
  receiving an instruction for triggering a sub-function control, and
  displaying a floating frame, wherein the floating frame is displayed on the interface of the annotation application, and the floating frame includes an option control corresponding to the triggered sub-function control.

In one or more embodiments, after displaying the floating frame, the processor 1001 further executes the following steps:
  receiving an instruction for triggering the option control in the floating frame, and
  displaying a target object corresponding to the triggered option control, wherein the target object is displayed on the interface of the annotation application.

In one or more embodiments, the processor 1001 further executes the following steps:
  displaying a system function control list on the interface of the annotation application, and displaying the system function control list at the third preset position of the interface of the annotation application, wherein the system function control list includes a system function control for instructing to switch to a system default interface.

In one or more embodiments, the processor 1001 further executes the following steps:
  receiving an instruction for triggering the system function control, and
  displaying the system default interface.

In one or more embodiments, when displaying the system function control list at the third preset position of the interface of the annotation application, the processor 1001 executes the following steps:
  displaying the system function control list at an edge position of the interface of the annotation application.

In one or more embodiments, the play control and/or the annotation control are displayed in the form of icons and/or texts.

In one or more embodiments, before displaying the play mode interface of the slide document and the interface of the annotation application, the processor 1001 further executes the following steps:
  receiving a wireless screen transmission instruction, and displaying a normal mode interface of the slide document; or,
  receiving a local document selecting instruction, and displaying the normal mode interface of the slide document; or,
  receiving a document selecting instruction of a removable disk, and displaying the normal mode interface of the slide document.

In one or more embodiments, before receiving the wireless screen transmission instruction, and displaying the normal mode interface of the slide document; or, receiving a local document selecting instruction, and displaying the normal mode interface of the slide document; or, receiving a document selecting instruction of a removable disk, and displaying the normal mode interface of the slide document, the processor 1001 further executes the following steps:
  displaying a startup interface of the interactive flat panel, wherein the startup interface includes a PowerPoint presentation control; and receiving an instruction for triggering the PowerPoint presentation control, and displaying sub-function controls corresponding to the PowerPoint presentation control.

In one or more embodiments, after displaying the slide play control list and the annotation control on the interface of the annotation application, the processor 1001 further executes the following steps:

receiving no touch signal within a preset time period after the slide play control list and the annotation control are displayed, and hiding the slide play control list and the annotation control.

In one or more embodiments, when the touch operation is of the first type, after performing page-turning of the slide document, the processor 1001 further executes the following steps:

displaying contents of the document after the page is turned, and synchronously displaying an annotation handwriting corresponding to the contents of the document after the page is turned.

In one or more embodiments, the processor 1001 further executes the following steps:

when a page-turning instruction is received, synchronously performing page-turning of the slide document and the annotation application.

In one or more embodiments of the present application, a play mode interface of a slide document and an interface of an annotation application are displayed on an interactive flat panel, and the interface of the annotation application is a transparent layer covering the interface of the slide document. A touch operation on the interface of the annotation application may be received. When the touch operation is of a first type, page-turning of the slide document is performed, and when the touch operation is of a second type, the slide document on the interface of the annotation application is annotated. In an Android system, touch events are usually abstracted and simplified into three types: pressing, moving, and lifting. For example, when a finger is pressed in a certain area, the Android system may send the touch event to the application in the topmost window of the area. Subsequent moving and lifting touch events are handed over to the application for processing, and the touch events are not sent to other applications covered by the window. As a result, the problem described in background of the application will occur, which makes it necessary to exit the annotation function to continue to operate the slide. In one or more embodiments of the present application, because Android platform of the interactive flat panel can modify an operation sending logic of the system, it is possible to implement touch operations on the interface of the annotation application to perform page-turning of the slide document, which reduces the difficulty of operating the interface of the lower layer by touching the interface of the upper layer in the scene that two display interfaces are overlapped. There is no need to exit the annotation interface, and it only needs to recognize the operation type of the touch operation on the interface of the annotation application, so as to trigger to directly control the slide in the case that the annotation interface has been started. The operation is convenient and quick, which improves the convenience of the slide operation after calling the annotation interface. In addition, by displaying relevant controls on the interface of the annotation application, it is possible to facilitate operating the slide document, and quickly switching to other display interfaces. This design conforms to the habits of the user and improves the user experience while also improving the operating efficiency of the slide document.

Figure 23:
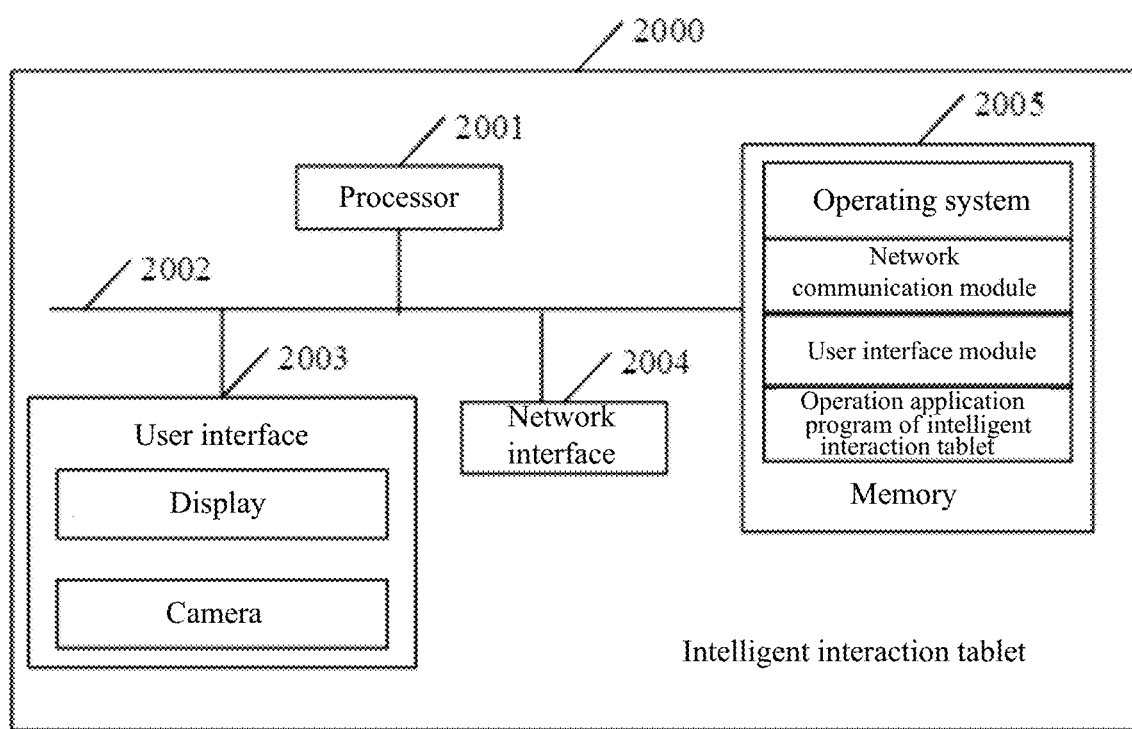
FIG. 23 is a schematic structure diagram of an interactive flat panel provided by an embodiment of the present application.

Referring to FIG. 23, which is a schematic structure diagram of an interactive flat panel provided by an embodiment of the present application. As shown in FIG. 23, an interactive flat panel 2000 includes: at least one processor 2001, at least one network interface 2004, a user interface 2003, a memory 2005, and at least one communication bus 2002.

As described herein, the communication bus 2002 is configured to implement connection communication between these components.

As described herein, the user interface 2003 can include a display and a camera, and optionally, the user interface 2003 can also include standard wired interface and wireless interface.

As described herein, the network interface 2004 can optionally include standard wired interface and wireless interface (such as a WI-FI interface).

As described herein, the processor 2001 can include one or more processing cores. The processor 2001 uses various interfaces and lines to connect various parts of the entire interactive flat panel 2000. By running or executing instructions, programs, code sets or instruction sets stored in the memory 2005, and calling data stored in the memory 2005, various functions of the interactive flat panel 2000 are performed, and data is processed. Optionally, the processor 2001 can be realized by using at least one of hardware forms: Digital Signal Processing (DSP), Field-Programmable Gate Array (FPGA), and Programmable Logic Array (PLA). The processor 2001 can be integrated with one or a combination of Central Processing Unit (CPU), Graphics Processing Unit (GPU), a modem, and the like. As described herein, CPU mainly processes the operating system, user interface, application programs, etc. GPU is responsible for rendering and drawing the content that the display screen needs to display. The modem is used to process wireless communication. It can be understood that the above-mentioned modem may not be integrated into the processor 2001, but can be implemented by a chip alone.

As described herein, the memory 2005 can include Random Access Memory (RAM), and can also include Read-Only Memory. Optionally, the memory 2005 includes a non-transitory computer-readable storage medium. The memory 2005 can be used to store instructions, programs, codes, code sets or instruction sets. The memory 2005 can include a program storage area and a data storage area, wherein the program storage area can store instructions for implementing the operating system, instructions for at least one function (such as touch function, sound play function, image play function, etc.), instructions for implementing the above-mentioned method embodiments, etc. The data storage area can store the data involved in the above-mentioned method embodiments, etc. Optionally, the memory 2005 can also be at least one storage device located far away from the above-mentioned processor 2001. As shown in FIG. 23, as a computer storage medium, the memory 2005 can include an operating system, a network communication module, a user interface module, and an operating application program of an interactive flat panel.

In the interactive flat panel 2000 as shown in FIG. 23, the user interface 2003 is mainly used to provide an input interface for the user to obtain data initiated by the user, and the processor 2001 can be used to call the operating application program of the interactive flat panel stored in the memory 2005, and perform the following operations:

displaying an interface of a preset format document and an interface of a writing application, wherein the interface of the writing application is a transparent layer covering the interface of the preset format document, receiving a touch operation on the interface of the writing application, when the touch operation is of a first type, responding to the touch operation on the interface of the preset format document, and when the touch operation is of a second type, responding to the touch operation on the interface of the writing application.

In one or more embodiments, when receiving the touch operation on the interface of the writing application, the processor 2001 executes the following steps:

receiving a finger touch operation on the interface of the writing application, and obtaining the number of touch points of the finger touch operation.

If the touch operation is of the first type, when responding to the touch operation on the interface of the preset format document, the processor 2001 executes the following steps:

when the number of touch points meets a first number range, sending the finger touch operation to the interface of the preset format document, and responding to the finger touch operation on the interface of the preset format document.

If the touch operation is of the second type, when responding to the touch operation on the interface of the writing application, the processor 2001 executes the following steps:

when the number of touch points meets a second number range, sending the finger touch operation to the interface of the writing application, and responding to the finger touch operation on the interface of the writing application, wherein the second number range is different from the first number range.

In one or more embodiments, the operating system of the interactive flat panel is an Android system. In the Android system, the processor 2001 further executes the following steps: getPointerCount in MotionEvent class is used to obtain the number of touch points corresponding to the finger touch operation; if PointerCount is greater than or equal to 2, the finger touch operation is determined as the multi-finger touch operation; if PointerCount is 1, the finger touch operation is determined as the single-finger touch operation.

In one or more embodiments, when receiving the touch operation on the interface of the writing application, the processor 2001 further executes the following steps:

receiving a pen touch operation in the overlap area, and obtaining the touch contact area of the pen touch operation.

If the touch operation is of the first type, when responding to the touch operation on the interface of the preset format document, the processor 2001 further executes the following steps:

when the touch contact area meets a first area range, sending the pen touch operation to the interface of the preset format document, and responding to the pen touch operation on the interface of the preset format document.

If the touch operation is of the second type, when responding to the touch operation on the interface of the writing application, the processor 2001 executes the following steps:

when the touch contact area meets a second area range, sending the pen touch operation to the interface of the writing application, and responding to the pen touch operation on the interface of the writing application, wherein the second area range is different from the first area range.

In one or more embodiments, when responding to the pen touch operation on the interface of the writing application, the processor 2001 further executes the following steps:

obtaining a touch position of the pen touch operation, and inputting text information at the touch position of the interface of the writing application.

In one or more embodiments, the operating system of the interactive flat panel is an Android system, and if the touch operation is of the first type, when responding to the touch operation on the interface of the preset format document, the processor 2001 executes the following steps:

sending the touch operation to the writing application and the preset format document respectively; for the writing application, calling onTouchEvent( ) in dispatchTouchEvent( ), giving no response to the touch operation and returning false; for the preset format document, calling onTouchEvent( ) in dispatchTouchEvent( ), responding to the touch operation and returning true.

In one or more embodiments, the processor 2001 further executes the following steps:

obtaining an identifier adding request initiated for the interface of the writing application, and adding an attribute identifier on the interface of the writing application based on the identifier adding request.

When responding to the touch operation on the interface of the writing application, the processor 2001 executes the following steps:

intercepting the touch operation sent to the interface of the preset format document, and when the touch operation is sent back to the interface of the writing application corresponding to the attribute identifier, triggering to respond to the touch operation on the interface of the writing application.

In one or more embodiments, the operating system of the interactive flat panel is an Android system, and if the touch operation is of the second type, when responding to the touch operation on the interface of the writing application, the processor 2001 executes the following steps:

sending the touch operation to the writing application and the preset format document respectively; for the writing application, calling onTouchEvent( ) in dispatchTouchEvent( ), responding to the touch operation and returning true; for the preset format document, calling onTouchEvent( ) in dispatchTouchEvent( ), giving no response to the touch operation and returning false.

In one or more embodiments, the operating system of the interactive flat panel is an Android system, and when intercepting the touch operation sent to the interface of the preset format document, the processor 2001 executes the following steps: calling onInterceptTouchEvent( ) in dispatchTouchEvent( ) to intercept the touch operation.

In one or more embodiments of the present application, an interface of a preset format document and an interface of an writing application are displayed on an interactive flat panel, and the interface of the writing application is a transparent layer covering the interface of the preset format document. A touch operation on the interface of the writing application may be received. When the touch operation is of a first type, a response to the touch operation is provided on the interface of the preset format document, and when the touch operation is of a second type, a response to the touch operation is provided on the interface of the writing application. Because Android platform of the interactive flat panel can modify an operation sending logic of the system, it is possible to implement touch operations on the interface of the writing application to perform page-turning of the preset format document, which reduces the difficulty of operating the interface of the lower layer by touching the interface of the upper layer in the scene that two display interfaces are overlapped.

Figure 24:
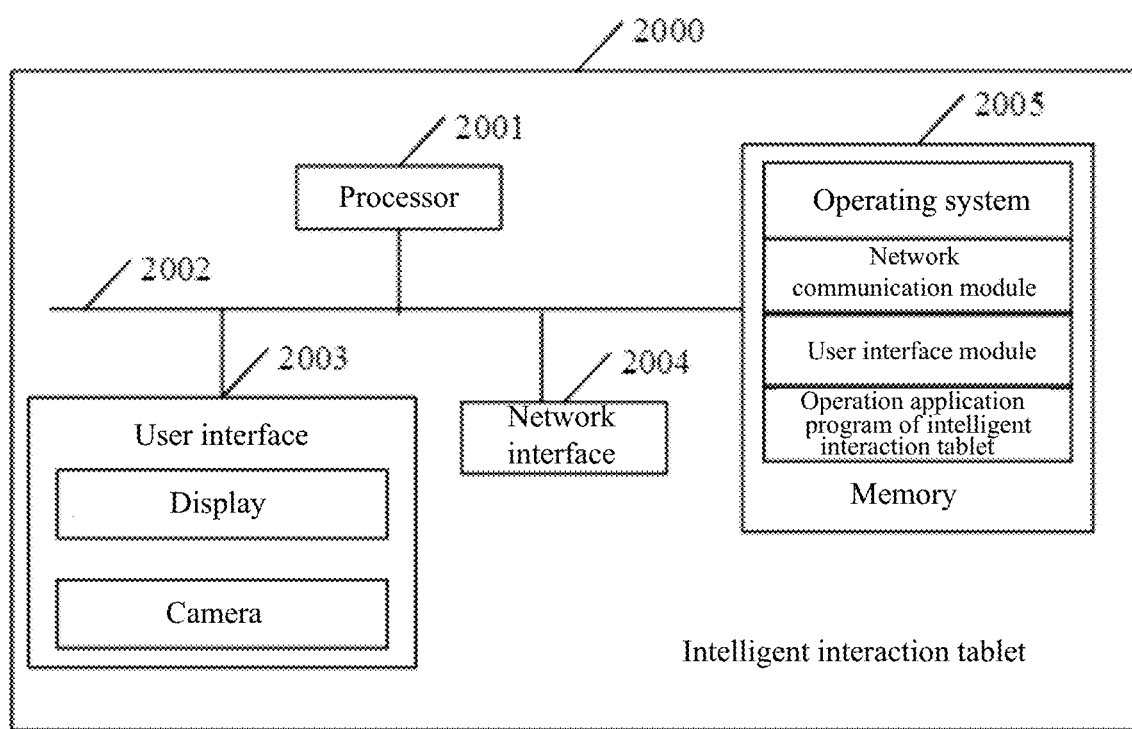
FIG. 24 is a schematic structure diagram of an interactive flat panel provided by an embodiment of the present application.

Referring to FIG. 24, which is a schematic structure diagram of an interactive flat panel provided by an embodiment of the present application. As shown in FIG. 24, an interactive flat panel 3000 includes: at least one processor 3001, at least one network interface 3004, a user interface 3003, a memory 3005, and at least one communication bus 3002.

As described herein, the communication bus 3002 is configured to implement connection communication between these components.

As described herein, the user interface 3003 can include a display and a camera, and optionally, the optional user interface 3003 can also include standard wired interface and wireless interface.

As described herein, the network interface 3004 can optionally include standard wired interface and wireless interface (such as a WI-FI interface).

As described herein, the processor 3001 can include one or more processing cores. The processor 3001 uses various interfaces and lines to connect various parts of the entire interactive flat panel 3000. By running or executing instructions, programs, code sets or instruction sets stored in the memory 3005, and calling data stored in the memory 3005, various functions of the interactive flat panel 3000 are performed, and data is processed. Optionally, the processor 3001 can be realized by using at least one of hardware forms: Digital Signal Processing (DSP), Field-Programmable Gate Array (FPGA), and Programmable Logic Array (PLA). The processor 3001 can be integrated with one or a combination of Central Processing Unit (CPU), Graphics Processing Unit (GPU), a modem, and the like. As described herein, CPU mainly processes the operating system, user interface, and application programs, etc. GPU is responsible for rendering and drawing the content that the display screen needs to display. The modem is used to process wireless communication. It can be understood that the above-mentioned modem may not be integrated into the processor 3001, but can be implemented by a chip alone.

As described herein, the memory 3005 can include Random Access Memory (RAM), and can also include Read-Only Memory. Optionally, the memory 3005 includes a non-transitory computer-readable storage medium. The memory 3005 can be used to store instructions, programs, codes, code sets or instruction sets. The memory 3005 can include a program storage area and a data storage area, wherein the program storage area can store instructions for implementing the operating system, instructions for at least one function (such as touch function, sound play function, image play function, etc.), instructions for implementing the above-mentioned method embodiments, etc. The data storage area can store the data involved in the above-mentioned method embodiments, etc. Optionally, the memory 3005 can also be at least one storage device located far away from the above-mentioned processor 3001. As shown in FIG. 24, as a computer storage medium, the memory 3005 can include an operating system, a network communication module, a user interface module, and an operating application program of an interactive flat panel.

In the interactive flat panel 3000 as shown in FIG. 24, the user interface 3003 is mainly used to provide an input interface for the user to obtain data initiated by the user, and the processor 3001 can be used to call the operating application program of the interactive flat panel stored in the memory 3005, and perform the following operations:

starting the interactive flat panel;

starting a slide play mode of the interactive flat panel;

displaying a play mode interface of a slide document and an interface of an annotation application on a display screen of the interactive flat panel, wherein the interface of the annotation application is a transparent layer covering the interface of the slide document, and the play mode interface plays a first image of the slide document;

receiving, via a touch sensing device of the interactive flat panel a touch operation on the interface of the annotation application, wherein the touch operation is a sliding operation of a finger on the interface of the annotation application, the sliding operation is a horizontal or vertical sliding action relative to a border of the interface of the annotation application;

when the sliding operation is a single-finger sliding operation, an Android mainboard of the interactive flat panel controlling the display screen of the interactive flat panel to display a sliding trajectory corresponding to the sliding operation, and the first image of the slide document played through the play mode interface remaining as it is; and when the sliding operation is a multi-finger sliding operation, and if the multi-finger sliding operation is a sliding operation by at least two fingers on the interface of the annotation application at the same time, and the multi-finger sliding operation is performed from top to bottom or from right to left relative to the interface of the annotation application, the Android mainboard of the interactive flat panel controlling the display screen to display a second interface of the slide document, and the display screen not displaying the sliding trajectory corresponding to the multi-finger sliding operation on the interface of the annotation application.

In one or more embodiments, the operating system of the interactive flat panel is an Android system. In the Android system, the processor 3001 further executes the following steps: getPointerCount in MotionEvent class is used to obtain the number of touch points corresponding to the touch operation; if PointerCount is greater than or equal to 2, the touch operation is determined as the multi-finger sliding operation; if PointerCount is 1, the touch operation is determined as the single-finger sliding operation.

In one or more embodiments, the operating system of the interactive flat panel is an Android system, and if the sliding operation is the multi-finger sliding operation, when an Android mainboard of the interactive flat panel controls the display screen to display the second interface of the slide document, the processor 3001 further executes the following steps:

sending the touch operation to the annotation application and the slide document respectively; for the annotation application, calling onTouchEvent( ) in dispatchTouchEvent( ), giving no response to the touch operation and returning false; for the slide document, calling onTouchEvent( ) in dispatchTouchEvent( ), responding to the touch operation and returning true.

In one or more embodiments, the operating system of the interactive flat panel is an Android system, and if the sliding operation is the single-finger sliding operation, when an Android mainboard of the interactive flat panel controls the display screen of the interactive flat panel to display the sliding trajectory corresponding to the sliding operation, the processor 3001 further executes the following steps:

sending the touch operation to the annotation application and the slide document respectively; for the annotation application, calling onTouchEvent( ) in dispatchTouchEvent( ), responding to the touch operation and returning true; for the slide document, calling onTouchEvent( ) in dispatchTouchEvent( ), giving no response to the touch operation and returning false.

In one or more embodiments, the operating system of the interactive flat panel is an Android system, and when for the slide document, calling onTouchEvent( ) in dispatchTouchEvent( ), giving no response to the touch operation and returning false, the processor 3001 executes the following steps: calling onlnterceptTouchEvent( ) in dispatchTouchEvent( ) to intercept the touch operation.

In one or more embodiments of the present application, an Android operating system may abstract and simplify touch events into three types: pressing, moving, and lifting. For example, when a finger is pressed in a certain area, the Android system may send the touch event to the application in the topmost window of the area. Subsequent moving and lifting touch events are handed over to the application for processing, and the touch events are not sent to other applications covered by the window. As a result, the problem described in background of the invention will occur, which makes it necessary to exit the annotation function to continue to operate the slide. In one or more embodiments of the present application, because Android platform of the interactive flat panel can modify an operation sending logic of the system, it is possible to implement touch operations on the interface of the annotation application to perform page-turning of the slide document. This reduces the difficulty of operating the interface of the lower layer by touching the interface of the upper layer in the scene that two display interfaces are overlapped. There is no need to exit the annotation interface, and it only needs to recognize the operation type of the touch operation on the interface of the annotation application, so as to trigger to directly control the slide in the case that the annotation interface has been started. The operation is convenient and quick, which improves the convenience of the slide operation after calling the annotation interface.

Those skilled in the art can understand that all or part of the processes in the above-mentioned embodiment methods can be implemented by instructing relevant hardware with a computer program. The program can be stored in a computer-readable storage medium. During execution, the program can include the processes of the above-mentioned method embodiments. As described herein, the storage medium can be a magnetic disk, an optical disc, a read-only storage memory, and a random storage memory, etc.

What is claimed is:

1. A method of an interactive flat panel, comprising:
   starting a slide play mode of the interactive flat panel;
   displaying a play mode interface of a slide document and an interface of an annotation application on a display screen of the interactive flat panel, wherein the interface of the annotation application is a transparent layer covering the play mode interface of the slide document, and the play mode interface plays a first image of the slide document;
   receiving, via a touch sensing device of the interactive flat panel, a touch operation directed at the interface of the annotation application, wherein the touch operation is a sliding operation of one or more fingers on the interface of the annotation application, and the sliding operation includes one of a horizontal sliding action or a vertical sliding action relative to a border of the interface of the annotation application;
   determining a number of fingers that perform the sliding operation;
   responding to determining that the sliding operation is a single-finger sliding operation corresponding to an annotation type operation, triggering the annotation application to annotate the slide document on the interface of the annotation application, wherein annotating the slide document comprises controlling, via an Android mainboard of the interactive flat panel, the display screen of the interactive flat panel to display a sliding trajectory corresponding to the sliding operation, wherein the first image of the slide document played through the play mode interface remaining as it is; and
   responsive to determining that the sliding operation is a multi-finger sliding operation corresponding to a non-annotation type operation,
      preventing the annotation application from responding to the sliding operation so that the display screen does not display the sliding trajectory corresponding to the multi-finger sliding operation on the interface of the annotation application; and
      controlling, via the Android mainboard of the interactive flat panel, the display screen to display a second interface of the slide document to perform page-turning of the slide document if the multi-finger sliding operation is a sliding operation of at least two fingers on the interface of the annotation application at the same time, and the multi-finger sliding operation is performed from top to bottom or from right to left relative to the interface of the annotation application.

2. The method according to claim 1, wherein an operating system of the interactive flat panel is an Android system that includes a MotionEvent class and a getPointerCount function in the MotionEvent class, wherein, if the getPointerCount function in the MotionEvent class is used to obtain the number of touch points corresponding to the touch operation, and wherein, if the number of touch points is greater than or equal to 2, the touch operation is determined as the multi-finger sliding operation, and if the number of touch points is 1, the touch operation is determined as the single-finger sliding operation.

3. The method according to claim 1, wherein the operating system of the interactive flat panel is an Android system and, if the sliding operation is the multi-finger sliding operation, controlling, via the Android mainboard of the interactive flat panel, the display screen to display the second interface of the slide document comprises:
   sending the touch operation to the annotation application and the slide document respectively;
   for the annotation application, calling an onTouchEvent( ) function in a dispatchTouchEvent( ) class, giving no response to the touch operation, and returning false; and
   for the slide document, calling the onTouchEvent( ) function in the dispatchTouchEvent( ) class, responding to the touch operation, and returning true.

4. The method according to claim 1, wherein the operating system of the interactive flat panel is an Android system, and, if the sliding operation is the single-finger sliding operation, controlling, via the Android mainboard of the interactive flat panel, the display screen of the interactive flat panel to display the sliding trajectory corresponding to the sliding operation comprises:

sending the touch operation to the annotation application and the slide document respectively;

for the annotation application, calling the onTouchEvent( ) function in the dispatchTouchEvent( ) class, responding to the touch operation, and returning true; and for the slide document, calling the onTouchEvent( ) function in the dispatchTouchEvent( ) class, giving no response to the touch operation, and returning false.

5. The method according to claim 4, wherein, for the slide document, calling the onTouchEvent( ) function in the dispatchTouchEvent( ) class, giving no response to the touch operation, and returning false comprises calling an onInterceptTouchEvent( ) function in the dispatchTouchEvent( ) class to intercept the touch operation.

6. The method according to claim 1, wherein the interactive flat panel comprises at least one of an LCD, LED, or PDP panel, and wherein the interactive flat panel is a large-screen display device.

7. The method according to claim 1, further comprising:
responsive to displaying the play mode interface of the document, executing an accessibility service function to start the annotation application.

8. The method according to claim 1, wherein a first type of the multi-finger sliding operation corresponds to turning to a next page, and a second type of the multi-finger sliding operation corresponds to turning to a previous page.

9. The method according to claim 1, further comprising:
converting the touch operation into a touch signal and transmitting the touch signal to an operating system of the interactive flat panel; and
encapsulating the touch signal to form a touch event.

10. The method according to claim 9, wherein encapsulating the touch signal to form the touch event comprises:
mapping the touch signal to a payload; and
filling a header to form the touch event, wherein the touch event comprises a data packet.

11. The method according to claim 9, wherein the operating system send the touch event to the annotation application, wherein the annotation application performs de-encapsulation of the touch event.

\* \* \* \* \*